(12) United States Patent
Conrad

(10) Patent No.: US 12,188,677 B2
(45) Date of Patent: Jan. 7, 2025

(54) HVAC SYSTEM

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 23 days.

(21) Appl. No.: 18/310,280

(22) Filed: May 1, 2023

(65) Prior Publication Data

US 2023/0266034 A1 Aug. 24, 2023

Related U.S. Application Data

(63) Continuation of application No. 17/372,200, filed on Jul. 9, 2021, now Pat. No. 11,680,726, which is a (Continued)

(30) Foreign Application Priority Data

Aug. 1, 2018 (CA) .................................. CA 3013005

(51) Int. Cl.
  *F24F 3/06* (2006.01)
  *B01D 46/00* (2022.01)
  (Continued)

(52) U.S. Cl.
  CPC ............ *F24F 11/871* (2018.01); *F24F 3/044* (2013.01); *F24F 3/06* (2013.01); *F24F 5/0046* (2013.01);
  (Continued)

(58) Field of Classification Search
  CPC .. F24F 11/871; F24F 3/044; F24F 3/06; F24F 5/0046; B01D 46/00
  See application file for complete search history.

(56) References Cited

U.S. PATENT DOCUMENTS 3,648,766 A 3/1972 Whalen
4,285,397 A 8/1981 Ostbo
(Continued)

FOREIGN PATENT DOCUMENTS

CN 201537766 U 8/2010
CN 207599923 U 7/2018
(Continued)

OTHER PUBLICATIONS

International Search Report, received in connection to International Patent Application PCT/CA2021/051504, mailed on Feb. 4, 2022.
(Continued)

*Primary Examiner* — Robert A Hopkins
(74) *Attorney, Agent, or Firm* — Philip C. Mendes da Costa; SMART & BIGGAR LP

(57) ABSTRACT

A single unit HVAC system for a unit in a multi-unit building comprises a first heat exchanger thermally connected to a riser stack, a plurality of fan coils, each fan coil comprising a unit heat exchanger and a motor and fan assembly wherein, in operation, the motor and fan assembly delivers air to a location in the unit, and a closed loop fluid flow path extending between the first heat exchanger and the plurality of unit heat exchangers. In operation, the first heat exchanger exchanges heat between the riser stack fluid and the closed loop fluid, each unit heat exchanger exchanges heat between the closed loop fluid and air that is delivered to a different room in the unit.

20 Claims, 20 Drawing Sheets

Related U.S. Application Data continuation-in-part of application No. 17/342,394, filed on Jun. 8, 2021, now Pat. No. 11,686,498, and a continuation-in-part of application No. 17/121,880, filed on Dec. 15, 2020, now Pat. No. 11,466,878, said application No. 17/342,394 is a continuation of application No. 16/525,210, filed on Jul. 29, 2019, now Pat. No. 11,060,752.

(51) Int. Cl.
*F24F 3/044* (2006.01)
*F24F 5/00* (2006.01)
*F24F 11/46* (2018.01)
*F24F 11/871* (2018.01)
*F24F 13/30* (2006.01)
*G05B 15/02* (2006.01)
*F24F 11/00* (2018.01)
*F24F 110/10* (2018.01)
*F24F 110/12* (2018.01)

(52) U.S. Cl.
CPC .............. *F24F 11/46* (2018.01); *F24F 13/30* (2013.01); *G05B 15/02* (2013.01); *F24F 2003/0446* (2013.01); *F24F 2011/0002* (2013.01); *F24F 2110/10* (2018.01); *F24F 2110/12* (2018.01); *G05B 2219/2614* (2013.01)

(56) References Cited

U.S. PATENT DOCUMENTS

| | | |
|---|---|---|
| 4,462,460 A | 7/1984 | Braver |
| 5,772,501 A | 6/1998 | Merry et al. |
| 6,109,044 A | 8/2000 | Porter et al. |
| 6,217,634 B1 | 4/2001 | Dominelli et al. |
| 7,308,906 B2 * | 12/2007 | Sinclaire ................ E03B 7/045 137/563 |
| 2013/0338837 A1 | 12/2013 | Hublou et al. |
| 2014/0001977 A1 | 1/2014 | Zacharchuk et al. |

FOREIGN PATENT DOCUMENTS

| | | | |
|---|---|---|---|
| JP | 2004028484 A | * | 1/2004 |
| JP | 2014106031 A | | 6/2014 |
| WO | 2010024044 A1 | | 2/2020 |

OTHER PUBLICATIONS

International Preliminary Report on Patentability, received in connection to International Patent Application PCT/CA2021/051504, mailed on Jun. 29, 2023.

* cited by examiner

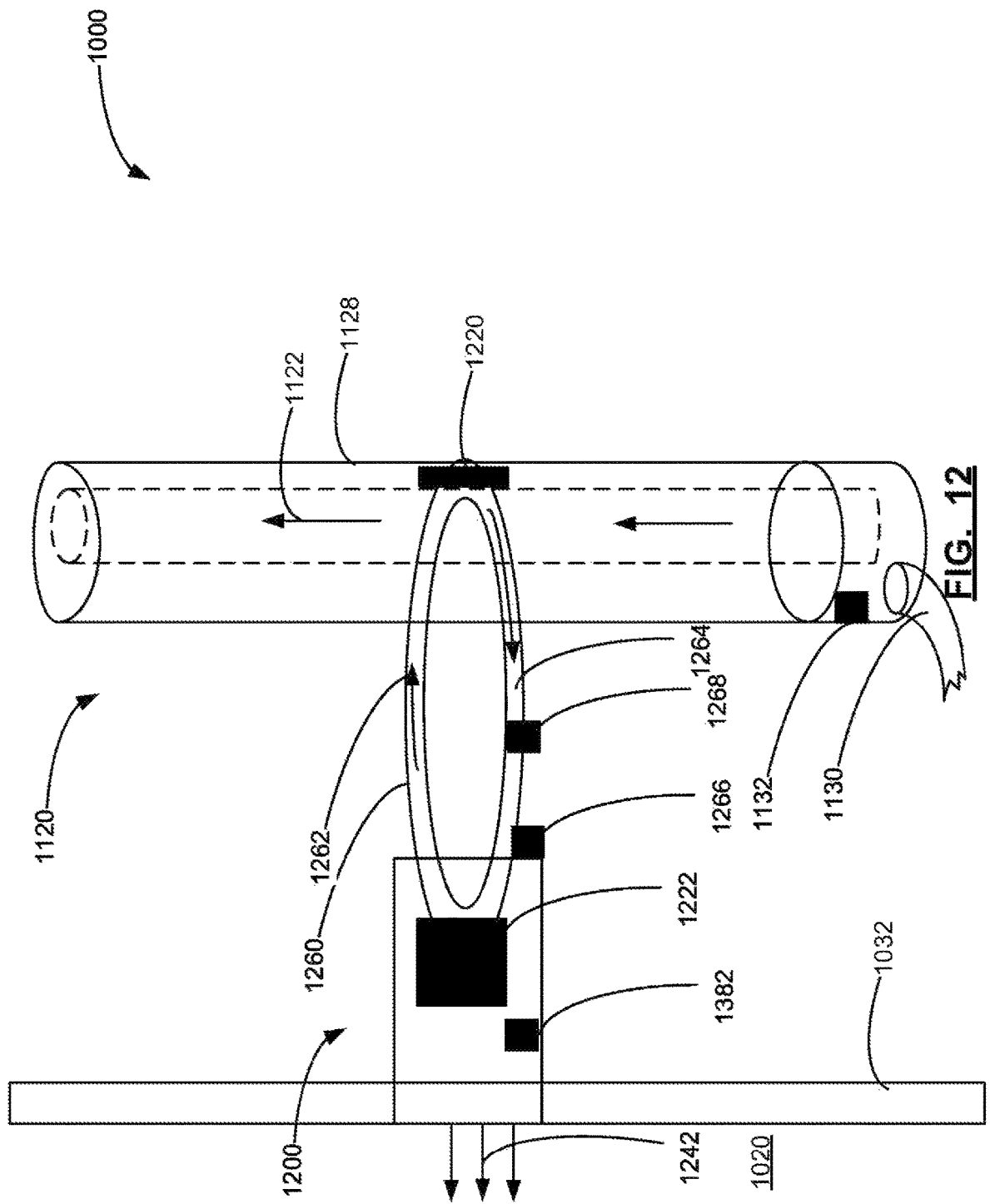

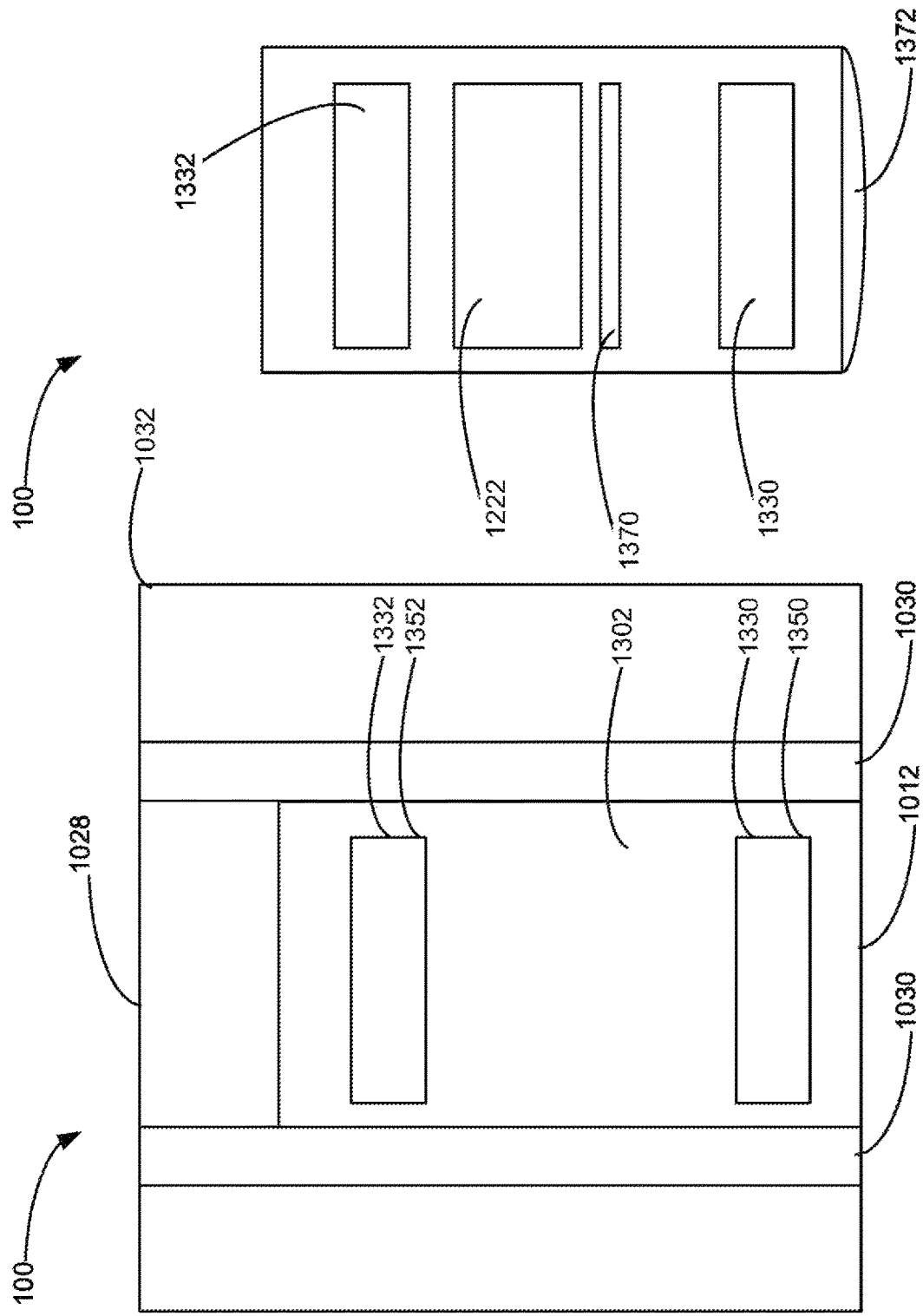

HVAC SYSTEM

CROSS-REFERENCE TO RELATED APPLICATIONS

This application is a continuation of U.S. patent application Ser. No. 17/372,200, filed on Jul. 9, 2021, now allowed, which is a continuation-in-part of U.S. patent application Ser. No. 17/121,880, filed on Dec. 15, 2020 and issued as U.S. Pat. No. 11,466,878 on Oct. 11, 2022, and is also a continuation-in-part of U.S. patent application Ser. No. 17/342,394, filed on Jun. 8, 2021, which is allowed, which itself is a continuation of U.S. patent application Ser. No. 16/525,210, filed on Jul. 29, 2019, and issued as U.S. Pat. No. 11,060,752 on Jul. 13, 2021, which itself claims priority to Canadian Patent Application No. 3,013,005, filed on Aug. 1, 2018, the disclosure of which is incorporated herein by reference

FIELD

This application relates to the field of HVAC systems in a multi-unit building and in particular, to systems having multiple heat exchangers for temperature control in a building. This application also relates to a HVAC system for a single unit, which may be a condominium, a house or a multiroom commercial facility.

INTRODUCTION

The following is not an admission that anything discussed below is part of the prior art or part of the common general knowledge of a person skilled in the art.

A fan coil is a component part of many residential, commercial, and industrial heating, ventilation and air conditioning (HVAC) systems, which provides treated (e.g., heated and/or cooled) air to a room in which they are installed or to multiple rooms. A fan coil comprises a heating and/or cooling heat exchanger and a fan. Air to be heated or cooled is introduced into the heat exchanger and cooled or heated by ambient air that is to be exhausted from the room. The fan coil may be controlled automatically by a thermostat which may activate the fan coil as required to maintain a set air temperature in the room.

Conventional environmental control systems may experience certain disadvantages, such as distributing heated or cooled air throughout a structure unnecessarily, unevenly or consuming excessive energy when attempting to achieve selected temperatures in different locations within a structure. There is a need to improve such environmental control systems to reduce these and other disadvantages.

SUMMARY

In accordance with one aspect of this disclosure, an intermediary fluid is utilized to transfer heat between a single unit (such as a condominium or an office) and a riser stack. The intermediary fluid may flow between a central source (such as a riser stack in a multi-unit building) and the HVAC system in the single unit. Accordingly, a continuous closed loop flow path may extend from the central source and the HVAC system in the single unit, and then back to the central source. An advantage of this design is that a low volume, low pressure fluid may be used as the intermediary fluid (which may be referred to as a closed loop fluid) and may be isolated from the riser, which operates under higher pressure. Isolating the closed loop from the riser may reduce the likelihood of damage to the building in the event of a leak because there is a lower volume of fluid that circulates exterior to the riser stack and that may travel across a part of a floor in a building and the fluid operates under a low pressure.

In accordance with this aspect, there is provided a multi-unit building HVAC system comprising:
a) a riser stack in flow communication with a closed loop fluid; and,
b) a first single unit HVAC system comprising:
  i. a first heat exchanger thermally connected to the riser stack
  ii. a second heat exchanger thermally connected to a fluid distribution system within the unit; and,
  iii. a closed loop fluid flow path extending between the first and second heat exchangers,
whereby the first heat exchanger exchanges heat between a riser stack fluid in the riser stack and the closed loop fluid in the closed loop fluid flow path and the second heat exchanger exchanges heat between the closed loop fluid and a distribution fluid of the fluid distribution system.

In any embodiment, the closed loop fluid may be a liquid and the distribution fluid may comprise air.

In any embodiment, the closed loop fluid may be a liquid and the closed loop fluid flow path may utilize 1-200 L, 2-100 L or 5-20 L of the closed loop fluid, which may be at a pressure of 1-30 psi or 5-15 psi.

In any embodiment, the riser fluid may be at a pressure of at least 100 psi, 150 psi, 200 psi or more.

In any embodiment, a floor in a building may have at least a first unit and a second unit, the first single unit HVAC system may provide temperature modulation to the first unit and a second single unit HVAC system may provide temperature modulation to the second unit.

In any embodiment, a floor in a building may have at least a first unit and the first single unit HVAC system may provide temperature modulation to the first unit and the riser stack may be exterior to the first unit.

In any embodiment, the riser may be provided interior of a liner conduit.

In any embodiment, the multi-unit building HVAC system may further comprise a riser leak detector which may issue a signal that terminates flow in the riser stack upon a leak in the riser stack being detected.

In any embodiment, the riser leak detector may comprise at least one of a float switch and a conductivity sensor.

In any embodiment, the multi-unit building HVAC system may further comprise a closed loop high pressure sensor which may issue a signal that terminates flow in the closed loop fluid flow path upon a high pressure condition being detected.

In any embodiment, the multi-unit building HVAC system may further comprise a closed loop leak detector which may issues a signal that terminates flow in the closed loop fluid flow path upon a leak in the closed loop fluid flow path being detected.

In any embodiment, the multi-unit building HVAC system may further comprise a capacitance leak detector wherein, upon occurrence of a leak, the capacitance leak detector may issue a signal that terminates flow in the riser stack if the capacitance leak detector detects a fluid having a capacitance above a present capacitance that is indicative of the riser fluid and the capacitance leak detector issues a signal that terminates flow in the closed loop fluid flow path if the capacitance leak detector detects a fluid having a capacitance below the present capacitance that is indicative of the closed loop fluid.

In any embodiment, a floor in a building may have at least a first unit, the unit may have a first room and a second room, the second heat exchanger may provide temperature modulation to the first room and the first single unit HVAC system may comprise a third heat exchanger that may provide temperature modulation to the second room and the third heat exchanger may exchange heat between the closed loop fluid and the distribution fluid of the fluid distribution system.

In any embodiment, a floor in a building may have at least a first unit and the fluid distribution system may comprise a fluid conduit that extends between the second heat exchanger and a room of the first unit.

In any embodiment, a floor in a building may have at least a first unit and the fluid distribution system may comprise a fluid conduit that extends between the second heat exchanger and a plurality of rooms of the first unit.

In any embodiment the closed loop fluid may be a liquid and the closed loop fluid flow path may comprise a conduit having a wall thickness of 0.01 to 0.06 inches or 0.02 to 0.04 inches.

In any embodiment, the conduit may be metal.

In accordance with another aspect of this disclosure, a fan coil is provided with a heat exchanger having a modulation fluid flow path and a unit air distribution flow path. The fan coil has a motor and fan assembly for distributing a distribution fluid into a unit of a building. An advantage of this design is that the fan coil may be isolated from a thermal source, such as a riser, that operates at a higher pressure than the modulation fluid in the fan coil. Accordingly, the heat exchanger may utilize thinner walled conduits, thereby enabling the heat exchanger to have a higher heat transfer rate. Further, the risk of damage to a building containing the fan coil is reduced, since the modulation fluid that circulates exterior to the riser stack and that may travel across a part of a floor in a building may operate at a lower volume and pressure than the thermal source.

In accordance with this aspect, there is provided a fan coil comprising:
  a) a heat exchanger comprising a modulation fluid flow path and a unit air distribution flow path, the unit air distribution flow path has an inlet for receiving air from a room and an outlet for delivering temperature modulated air, wherein the modulation fluid flow path is operable to receive a fluid that is at a pressure of up to 50 psi; and,
  b) a first motor and fan assembly in the unit air distribution flow path.

In accordance with another aspect of this disclosure, the unit air distribution flow path has a lower port positioned adjacent a floor of a room and an upper port positioned adjacent a ceiling of a room and the motor and fan assembly is reversible between a first mode to direct air through the upper port and a second mode to direct air through the lower port. An advantage of this design is that the fan coil system air flow path may be reversed depending on the ambient environment of the room. For example, during winter, hot air from the ceiling may be exhausted through the lower port to heat the room more efficiently and during summer, cool air from the floor may be exhausted through the upper port to cool the room more efficiently.

In accordance with this aspect, there is provided a fan coil system comprising:
  a) a heat exchanger comprising a modulation fluid flow path and a unit air distribution flow path, the unit air distribution flow path has an inlet for receiving air from a room and an outlet for delivering temperature modulated air, the modulation fluid flow path is connectable with a source of heating or cooling fluid; and,
  b) a first reversing motor and fan assembly in the unit air distribution flow path,
wherein the unit air distribution flow path has a lower port positioned to be adjacent a floor of a room and an upper port positioned to be adjacent a ceiling of a room, and the first reversing motor and fan assembly is operable in a first mode to direct air through the upper port and is also operable in a second mode to direct air through the lower port, wherein, in the first mode, the lower port functions as the inlet and the upper port functions as the outlet and in the second mode the upper port functions as the inlet and the lower port functions as the outlet.

In accordance with another aspect of this disclosure, the fan coil is provided behind a wall of a unit in the building and between two studs of the wall. An advantage of this design is that the fan coil is small enough to fit flush, or mostly flush, with the wall of the unit, without extending into the floor space of the unit. Accordingly, the fan coil footprint is reduced, and need not take up floor space of the unit. For example, instead of a conventional fan coil that takes up floor space in a corner of the unit, the fan coil may be hidden in the wall to increase the usable area of the unit.

In accordance with this aspect, there is provided a building comprising a first unit, the first unit having a fan coil comprising a heat exchanger and a motor and fan assembly wherein the fan coil is positioned behind a wall and between two studs of the unit.

In accordance with another aspect of this disclosure, the HVAC system is provided with a fan coil that is positioned in a wall separating a first room and a second room. An advantage of this design is that a single fan coil may be used to supply air to multiple rooms. Another advantage is that the amount of air provided to each room may be controlled by the fan coil to better achieve a desired room temperature in each room.

In accordance with this aspect, there is provided a building comprising a first unit, the first unit having a first HVAC system, a first room and an adjacent second room, the first HVAC system comprising a fan coil positioned in a wall separating the first and second rooms, each room having an air return and an air outlet from the fan coil wherein the fan coil is in flow communication with the air return of each room and is also in flow communication with the air outlet of each room.

In accordance with another aspect of this disclosure, an HVAC system is provided with a fan coil having a movable portion that is located within an air distribution flow path (e.g., an air flow duct leading to or from the fan coil). An advantage of this design is that the movable portion of the fan coil (e.g., the motor and fan assembly, the heat exchanger or optionally the entire fan coil) may be moved within the flow path to an access point in a wall, such as the air return or the air outlet. Moving the movable portion to an access point may allow for the fan coil to be located behind a wall (e.g., behind a sheet of drywall) while enabling maintenance and/or cleaning of the moveable portion.

In accordance with this aspect, there is provided a building comprising a first unit, the first unit having an HVAC system comprising a fan coil positioned in a wall and an air distribution flow path, the air distribution flow path comprising an air return and an air outlet wherein at least a portion of the fan coil is movably mounted within the air distribution flow path to a position in which the fan coil is located at one of the air return and the air outlet.

In accordance with another aspect of this disclosure, a fan coil system is provided with a first motor and fan assembly and a second motor and fan assembly. An advantage of this design is that the rate of rotation of the fan of each motor and fan assembly may be reduced without reducing the overall air flow rate of the fan coil system. Reducing the rate of rotation of the fan of each motor and fan assembly may reduce the power required to achieve the desired flow rate, reduce the noise associated with the system and increase the lifetime of the motor and fan assemblies.

In accordance with this aspect, there is provided a fan coil system comprising:
- a) a heat exchanger comprising a modulation fluid flow path and an air distribution flow path, the air distribution flow path has a first port and a second port, the modulation fluid flow path is connectable with a source of heating or cooling fluid;
- b) a first motor and fan assembly in the unit air distribution flow path wherein the first motor and fan assembly is operable to draw air from the first port and to direct air out through the second port whereby the first port functions as an air return of the air distribution flow path and the second port functions as an air outlet of the air distribution flow path; and,
- c) a second motor and fan assembly in the unit air distribution flow path wherein the second motor and fan assembly is operable to draw air from the second port and to direct air out through the first port whereby the second port functions as an air return of the air distribution flow path and the first port functions as an air outlet of the air distribution flow path.

In accordance with another aspect of this disclosure, a single unit HVAC system uses a plurality of modulation fluid flow paths to provide to heat or cool different rooms or different locations in an open space. Accordingly, a single closed loop flow path may extend between a riser stack and a unit and the closed loop flow path may extend (e.g., it may split into different sub-loops within the unit or may be a continuous loop that passes through two or more rooms) to heat exchangers in flow communication with different rooms or parts of a room. Alternately, a plurality of closed loop flow paths may extend between a riser stack and the unit. For example, a first temperature sensor may be operable to monitor the temperature of a first room and a second temperature sensor may be operable to monitor the temperature of a second room. Each room may have a heat exchanger and the amount of heating or cooling that is provided to each room may be adjusted by adjusting the amount of fluid flowing to each heat exchanger and/or the rate of closed loop fluid flowing to each heat exchanger and/or the amount of air flowing into each room for the heat exchanger. An advantage of this design is that the temperature of each room may be independently controlled by its respective temperature sensor to achieve separate desired temperatures for each room.

In accordance with this aspect, there is provided an HVAC system for a single unit having a first room and a second room, the HVAC system comprising:
- a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
- b) a first temperature sensor operable to monitor a temperature of the first room, wherein the air outlet of the first room comprises a first adjustable damper and the first damper is adjustable based on a signal from the first temperature sensor;
- c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and,
- d) a second temperature sensor operable to monitor a temperature of the second room, wherein the air outlet of the second room comprises a second adjustable damper and the second damper is adjustable based on a signal from the second temperature sensor, wherein the first and second modulation fluid flow paths are operable to receive a fluid that is at a pressure of up to 50 psi.

In accordance with this aspect, there is also provided an HVAC system for a single unit having a first room and a second room, the HVAC system comprising:
- a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
- b) a first temperature sensor operable to monitor a temperature of the first room;
- c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and,
- d) a second temperature sensor operable to monitor a temperature of the second room, wherein the first and second modulation fluid flow paths are part of a closed loop fluid flow path extending between the first and second heat exchangers and a riser stack of a building and a flow of fluid in the first modulation fluid flow path is adjustable based on a signal from the first temperature sensor.

In accordance with this aspect, there is also provided an HVAC system for a single unit having a first room and a second room, the HVAC system comprising:
- a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
- b) a first temperature sensor operable to monitor a temperature of the first room wherein the first modulation fluid flow path is part of a first closed loop fluid flow path extending between the first heat exchanger and a riser stack of a building and a flow of fluid in the first modulation fluid flow path is adjustable based on a signal from the first temperature sensor;

c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and, d) a second temperature sensor operable to monitor a temperature of the second room, wherein the second modulation fluid flow path is part of a second closed loop fluid flow path extending between the second heat exchanger and a riser stack of a building and a flow of fluid in the second modulation fluid flow path is adjustable based on a signal from the second temperature sensor.

In accordance with another aspect of this disclosure, an HVAC system is provided with a heat retaining member in thermal communication with a modulation fluid flow path of a heat exchanger. An advantage of this design is that the heat retaining member may be used to store thermal energy (e.g., from the sun), thereby more efficiently modulating the temperature of one or more rooms in the HVAC system. Another advantage is that the heat retaining member may be thermally charged by an outside source, such as a solar-powered source to conserve energy in the HVAC system.

In accordance with this aspect, there is provided an HVAC system comprising:

a) a heat exchanger comprising a modulation fluid flow path and an air distribution flow path, the air distribution flow path has an inlet for receiving air and an air outlet for delivering temperature modulated air;

b) a first motor and fan assembly provided in the air distribution flow path; and, c) a heat retaining member in thermal communication with the modulation fluid flow path, wherein the heat retaining member comprises a solid material.

In accordance with another aspect of this disclosure, a ventilation system is provided comprising an air treatment apparatus (e.g., a fan coil), which is operable to move air within a volume (e.g., a room in a house, a house, a condominium, a factory, office space or the like) and an oxygen concentrator operable in an oxygen enrichment mode to enhance the level of oxygen in air which exits the air treatment apparatus and is introduced into the volume. Optionally, the oxygen concentrator may transfer oxygen from air which is to be exhausted from the volume (exhaust air) and deliver at least some of that oxygen to the air that is to be outputted from the air treatment apparatus. For example, a fan coil may include an air-to-air heat exchanger and part of the return air may be exhausted as exhaust air. Oxygen may be removed from the exhaust air and delivered to the return air that is to be outputted from the air treatment apparatus into the volume. An advantage of this design is that the air that is outputted from the air treatment apparatus may be enriched with oxygen from the exhaust air, thereby recycling oxygen from the exhaust air.

In accordance with this aspect, there is provided an HVAC system comprising:

a fan coil having an exhaust air outlet port through which exhaust air exits the fan coil and an air inlet port through which input air enters the fan coil; and, an oxygen concentrator operable in an oxygen enrichment mode to transfer oxygen from the exhaust air and deliver the oxygen to the input air.

In any embodiment, the oxygen concentrator may be a regenerable oxygen concentrator.

In any embodiment, the oxygen concentrator may be a pressure swing adsorption oxygen concentrator.

In any embodiment, in the oxygen enrichment mode, the oxygen concentrator may adsorb nitrogen from the exhaust air using a molecular sieve thereby providing oxygen enriched air and the oxygen enriched air may be combined with the input air.

In any embodiment, the oxygen concentrator may also be operable in a regeneration mode wherein the nitrogen is desorbed from the molecular sieve.

In any embodiment, fan coil may be part of a HRV or ERV unit and the oxygen concentrator may be part of the HRV or ERV unit.

In any embodiment, the HVAC system may further comprise an oxygen sensor operably connected to the oxygen concentrator whereby the oxygen concentrator may be actuated when the oxygen sensor detects an oxygen level below a predetermined level.

In any embodiment, the oxygen concentrator may be deactivated when the oxygen sensor detects an oxygen level above a predetermined level.

In any embodiment, the oxygen concentrator may be connected in flow communication with the exhaust air outlet port and the input air inlet port.

In any embodiment, the oxygen concentrator may receive a bleed stream of the exhaust air.

In any embodiment, the fan coil may include a heat exchanger and the oxygen concentrator may be connected in flow communication with the input air upstream of the heat exchanger.

In any embodiment, the HVAC system may further comprise a filter positioned upstream of the oxygen concentrator.

In accordance with another aspect of this disclosure, an air treatment apparatus for an enclosed living space is providing having an air flow path extending from an air inlet to an air outlet with an oxygen concentrator in the air flow path. The oxygen concentrator is operable in an oxygen enrichment mode for removing nitrogen from air entering the air inlet of the air treatment apparatus and a regeneration mode for purging the nitrogen captured by the oxygen concentrator to a location exterior to the living space. An advantage of this design is that the oxygen concentration of stale air entering the air treatment apparatus may be increased before it is returned to the enclosed space, thereby improving the air quality of the living space.

In accordance with this aspect, there is provided an air treatment apparatus for an enclosed living space comprising an air flow path extending from an air inlet to an air outlet with an oxygen concentrator and an air moving member provided in the air flow path, wherein the oxygen concentrator is operable in an oxygen enrichment mode in which nitrogen is removed from air entering the air inlet and oxygen enriched air is exhausted from the air outlet and the oxygen concentrator is also operable in a regeneration mode wherein the nitrogen that was removed from air entering the air inlet is exhausted at a location exterior to the living space.

In any embodiment, the apparatus may be portable whereby the apparatus may be operated in the oxygen enrichment mode when located in the living space and the apparatus may be operated in the regeneration mode when located exterior to the living space.

In any embodiment, the apparatus may have an inlet conduit which may extend from a location exterior to the living space to the air inlet whereby, in the oxygen enrichment mode, fresh air may be drawn into the inlet conduit from exterior to the living space and oxygen enriched air may exit the air outlet to the living space.

In any embodiment, the apparatus may have an outlet conduit which extends from an exhaust outlet to a location exterior to the living space whereby, in the regeneration mode, nitrogen that was removed from air entering the inlet conduit may be exhausted through the outlet conduit to the location exterior to the living space.

In any embodiment, the HVAC system may further comprise a filter positioned upstream of the oxygen concentrator.

In any embodiment, the HVAC system may further comprise a wall mount or a window mount.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 12 is a perspective view of a single unit HVAC system of FIG. 2;

FIG. 14A is a front view of a single unit HVAC system installed within a wall;

FIG. 14B is a front view of the single unit HVAC system of FIG. 5A with a front panel (optionally drywall) removed;

Figure 1:
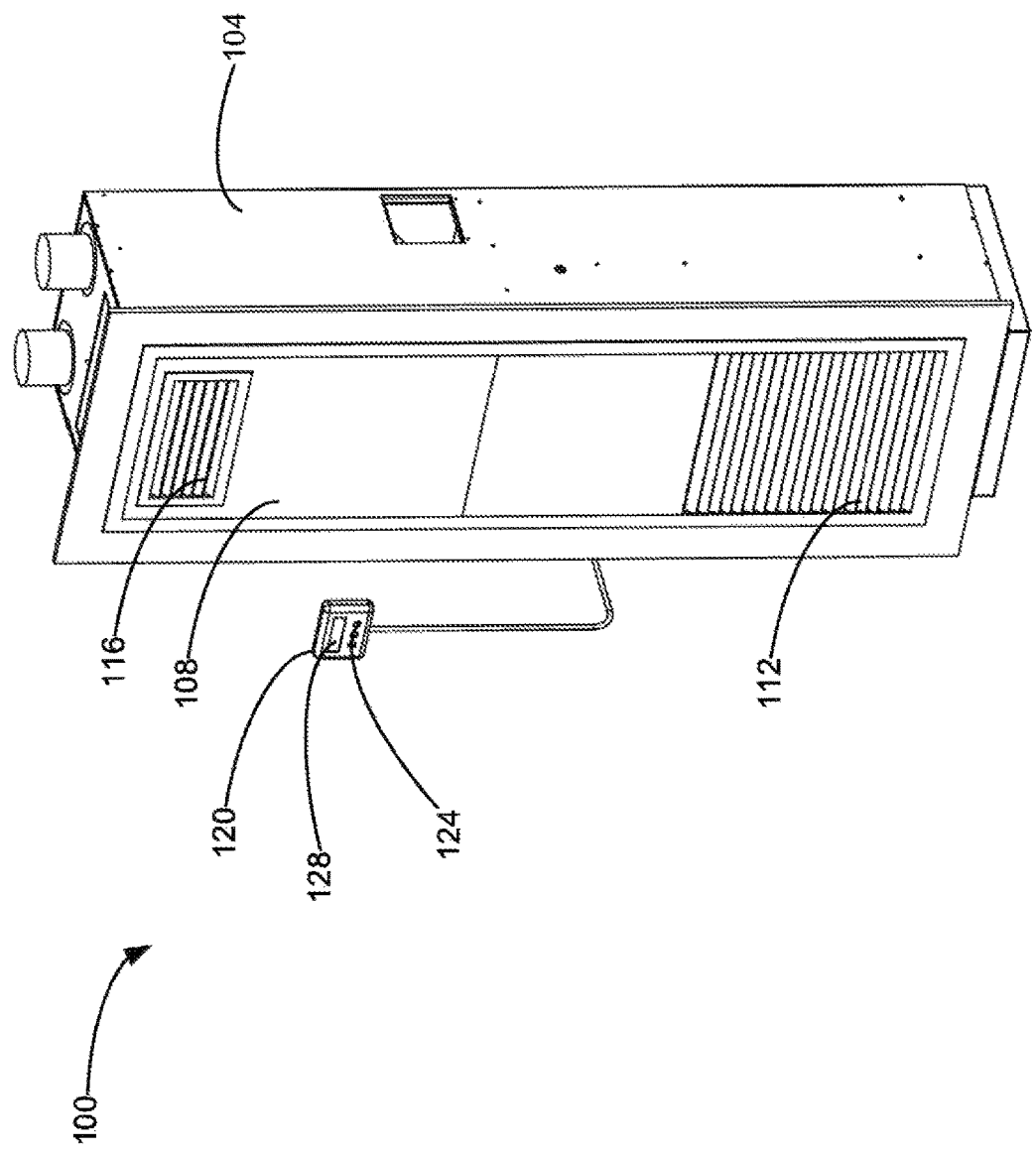
FIG. 1 is a front perspective view of a fan coil of an HVAC system.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

General Description of a Fan coil

The following is a general description a fan coil for use in an HVAC system.

Figure 2:
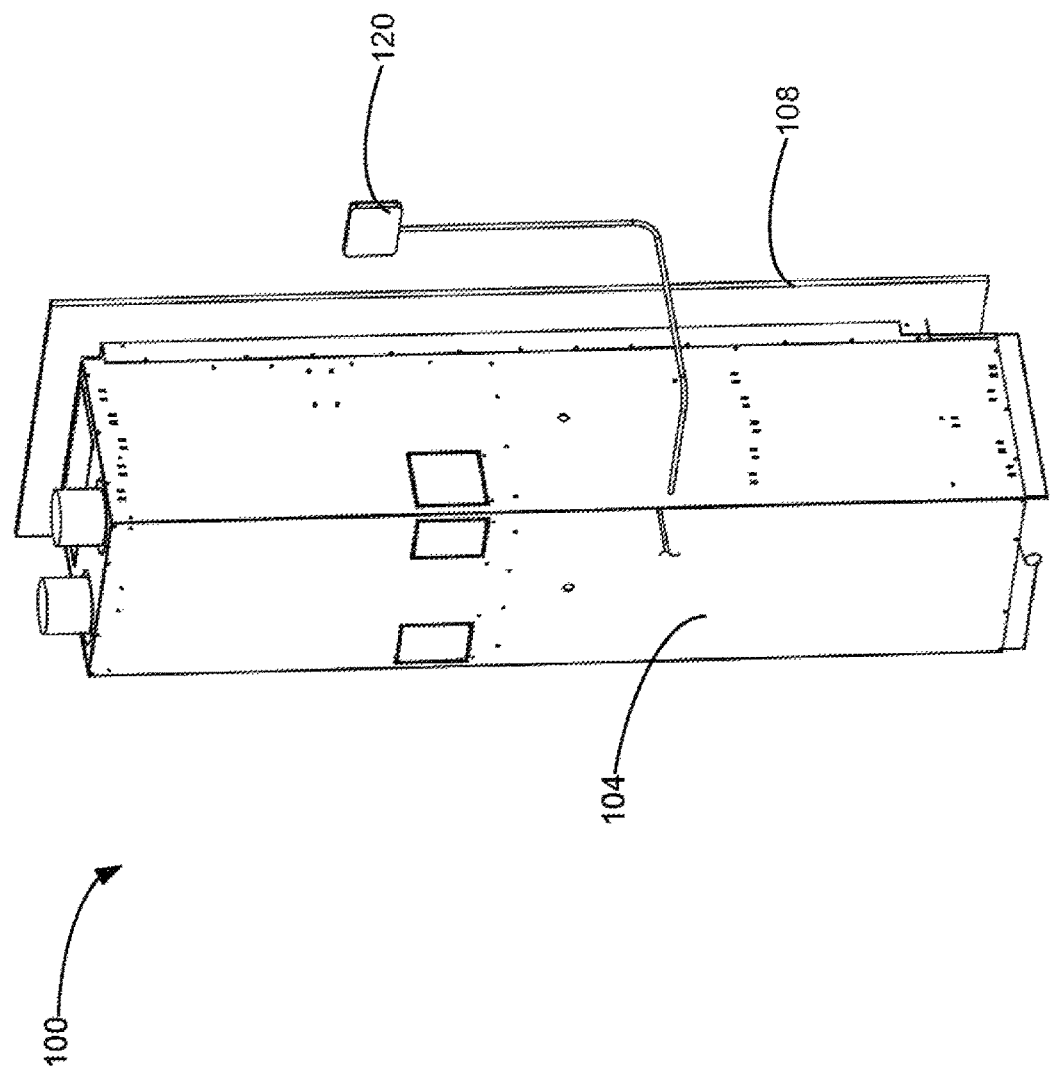
FIG. 2 is a rear perspective view of the fan coil of FIG. 1.

FIGS. 1 and 2 exemplify the use of a fan coil 100, as an oxygen enrichment apparatus. In the illustrated example, fan coil 100 includes a housing 104 including a front face 108 defining an air inlet 112 and an air outlet 116. The fan coil 100 is operable to receive air from air inlet 112, heat or cool the air introduced from inlet 112 and optionally, in addition or alternately, humidify the air, and discharge the treated air through air outlet 116 into a volume. The volume may be a room (e.g., a room in a house), a house, a condominium, a factory, office space or the like). For convenience, the volume is referred to herein as room 300.

The example shown includes a housing 104 that is substantially cuboid (i.e. box-shaped). An advantage of this design is that it provides an efficient and convenient form factor for applications where the fan coil 100 is recessed into a flat wall. However, in alternative embodiments, fan coil housing 104 can have any size and shape best suited for the intended application.

In the example shown, the fan coil inlet and outlet 112 and 116 are formed in the front face 108 of the fan coil housing 104. This design provides an efficient self-contained apparatus 100 that can be easily accommodated into a room design.

However, in alternative embodiments, the fan coil inlet 112, the fan coil outlet 116, or both may be located remotely from the fan coil housing 104. For example, the fan coil inlet 112 and the fan coil outlet 116 may be fluidly connected to the fan coil housing 104 by one or more airflow conduits to allow the fan coil 100 to service one or more rooms remote from the fan coil 100 (e.g., via ducting built into a wall or ceiling of a building). In accordance with such an example, the fan coil may be a furnace for a house, factory, office building or the like. In some embodiments, fan coil 100 may include a plurality of fan coil air inlets 112, a plurality of fan coil air outlets 116, or a plurality of fan coil air inlets 112 and a plurality of fan coil air outlets 116. For example, fan coil 100 may include a plurality of fan coil air outlets 116 directed to different rooms. This allows one fan coil 100 to service several rooms.

Still referring to FIGS. 1 and 2, an air regulating device 120 is shown connected to fan coil 100. The air regulating device 120 may operate as a thermostat and/or a hygrostat, capable of sensing air temperature and/or air humidity, and signaling the fan coil 100 to generate heated, cooled and/or humidified air in order to maintain the room air at a set temperature and/or humidity.

For example, the air regulating device 120 may be programmed to maintain the room air at 21° C. and 40% relative humidity for comfortable human occupancy. Air regulating device 120 can be any thermostat and/or hygrostat device known in the art and may be connected to the fan coil by any means (e.g., wires, Wi-Fi, Bluetooth, or the like). In the illustrated embodiment, air regulating device 120 includes inputs 124 for user interaction (e.g. buttons to enter a set air temperature and relative humidity), and an optional display 128 (e.g. to display the current air temperature and relative humidity).

Figure 3:
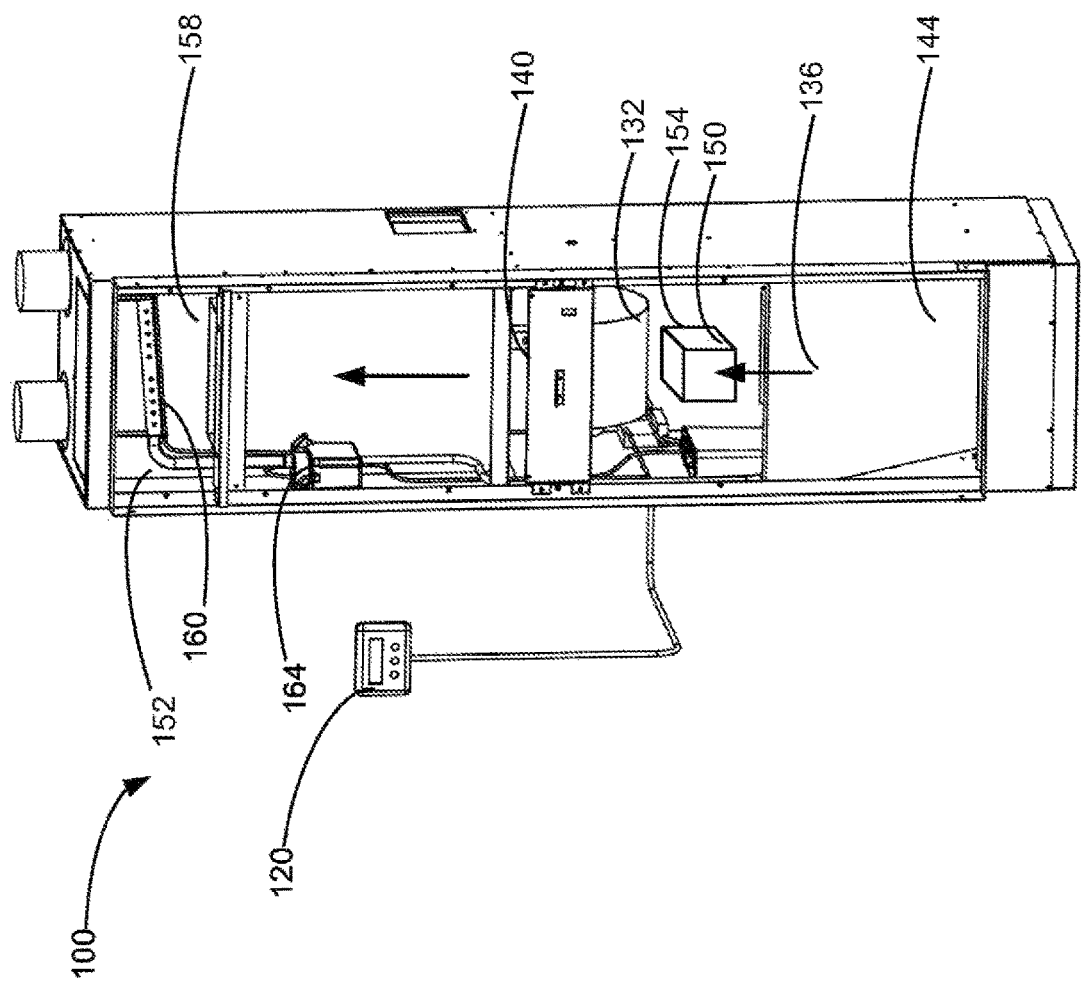
FIG. 3 is a front perspective view of the fan coil of FIG. 1 with the front panel removed.
Figure 4:
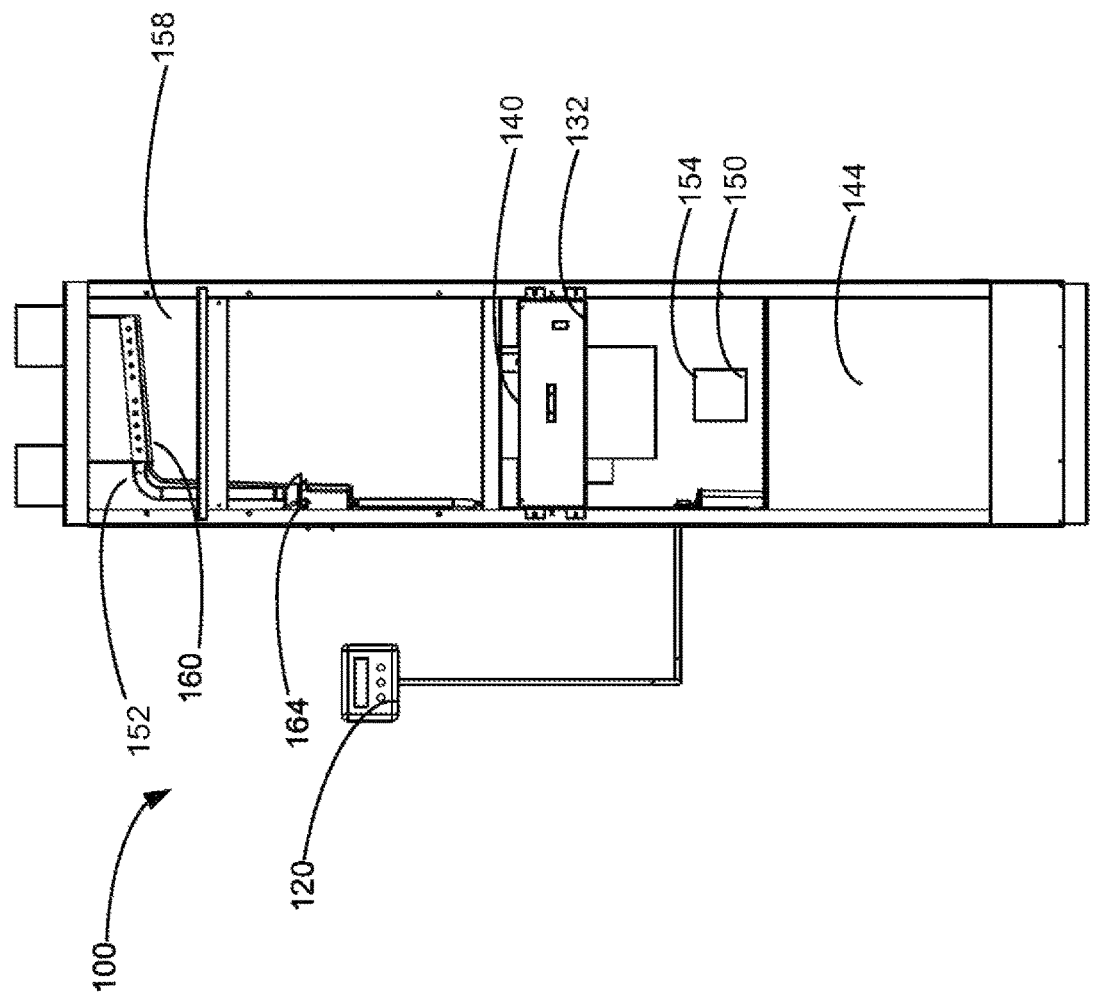
FIG. 4 is a front view of the fan coil of FIG. 1 with the front panel removed so as to show the interior of the fan coil.

Reference is now made to FIGS. 3-4 which shows fan coil 100 with front face 108 (FIG. 1) removed so that some of the internal components are visible. It will be appreciated that the fan coil may be of any design known in the art and may use any flow path, and any heating unit and/or air conditioning unit and/or dehumidification unit known in the heating and cooling arts. As exemplified, fan coil 100 includes an air moving member 132 (e.g., a blower) and an air flow path 136 which extends the air inlet 112, through the temperature regulation (e.g., heating) zone 150 having a heat exchanger 154, through the air moving member 132, and from the air moving member outlet 140 through the humidification zone 158 to the fan coil air outlet 116.

As exemplified in FIGS. 3 and 4, fan coil 100 is shown including a humidification unit 164 having a humidification outlet tube 160 for humidifying air in the fan coil air flow path 136 so that humidified air is discharged from fan coil air outlet 116. When air is heated in heating zone 150, the relative humidity of the air may decrease. The humidity added by humidification unit 164 can help to maintain or increase the relative humidity of the air after heating, such as to attain or maintain a set humidity programmed into air regulating device 120.

It will be appreciated that the forgoing is a general description of a type of air treatment apparatus. The following discussion relating to the oxygen enhancement of air in a living space may be used with any HVAC system and the discussion refers to a fan coil as only an exemplary embodiment.

Oxygen Concentrator

In accordance with this disclosure, the fan coil 100 is in air flow communication with an oxygen concentrator 200. The oxygen concentrator 200 operates to increase the concentration of oxygen in the air that is delivered to a room (e.g., before it is exhausted from the fan coil 100). An advantage of this aspect is that the quality of air exhausted into a room 300 from the fan coil 100 may be improved.

As exemplified in FIGS. 5-8, the fan coil 100 includes an oxygen concentrator 200. The oxygen concentrator 200 is operable in an oxygen enrichment mode in which the concentration of oxygen exhausted from the fan coil 100 to the room 300 is increased. When the oxygen concentrator is operating in the oxygen enrichment mode, as exemplified in FIGS. 5 and 7 the oxygen concentrator 200 transfers oxygen from the exhaust air and delivers the oxygen to air that is to be exhausted from outlet 116. Accordingly, conditioned input air (air which has been heated or cooled and/or humidified and/or filtered, but which has an increased level of oxygen) is exhausted through the air outlet 116 into the room 300.

It will be appreciated that the fan coil may incorporate the oxygen concentrator 200 or the oxygen concentrator 200 may be remote therefrom. For example, the oxygen concentrator 200 may be provided in an exhaust air stream that has exited, or is to exit, the fan coil 100 and oxygen recovered from the exhaust air by the oxygen concentrator 200 may be delivered to the room 300, e.g., by being added to air flowing through an air flow conduit that is part of an HVAC system and/or by being delivered to the room but a separate oxygen enhanced air flow conduit.

It will be appreciated that the oxygen may be obtained from any air stream that is to not be recycled to the room 300 and the oxygen separated from the air stream by the oxygen concentrator may be returned to the room by itself or added to an air stream that is to be delivered to the room 300.

It will also be appreciated that the oxygen concentrator 200 may be any device that is capable of increasing the oxygen concentration in an airflow, e.g., by isolating (e.g., adsorbing) oxygen in an air stream that is to not be recycled to the room 300. For example, the oxygen concentrator 200 may be a pressure swing adsorption oxygen concentrator. A pressure swing adsorption oxygen concentrator operates by using an adsorbent material as a trap for gases at high pressure. For example, when air is passed through zeolite, nitrogen is removed from the air and adsorbed into the zeolite. The remaining air thus has a higher concentration of oxygen due to the removed nitrogen.

Accordingly, in the case of a pressure swing oxygen concentrator operating in the oxygen enrichment mode, the oxygen concentrator 200 adsorbs nitrogen from the air (e.g., exhaust air) using the adsorbent material, thereby providing oxygen enriched air. The oxygen enriched air may then be combined with the input air (e.g., entering via inlet 112) before exiting the fan coil 100. It will be appreciated that the adsorbent material may be any material capable of adsorbing a component of air to provide oxygen or oxygen enriched air. For example, the adsorbent material may be, including but not limited to, zeolites, activated carbon, and/or a molecular sieve.

In some embodiments, the oxygen concentrator 200 may have a plurality of molecular sieves. Increasing the number of molecular sieves may improve the speed and efficiency of nitrogen removal from the exhaust air.

In some embodiments, the oxygen concentrator 200 may be a regenerable oxygen concentrator. Once the adsorbent material has reached a certain adsorbency level, the adsorbent material may be regenerated by reducing the pressure in the oxygen concentrator 200, thereby allowing the release of the trapped elements. Accordingly, the oxygen concentrator 200 may be operable in a regeneration mode, as exemplified in FIGS. 6 and 8. When in the regeneration mode, the nitrogen that was adsorbed by the adsorbent material during the oxygen enrichment mode is desorbed from the adsorbent material. The desorbed nitrogen may then be exhausted from the HVAC system to an exterior area 310.

It will be appreciated that the input air to the fan coil 100 may be recirculated air from the volume (e.g., room) that is to be conditioned by the fan coil (e.g., air that enters through air inlet 112) and/or fresh air from an external source (e.g., external to a building or a condominium or a house). Optionally, recirculated air is combined with fresh air. The fresh air may be combined with the recirculated air at any location in the HVAC system (e.g., in the fan coil) as the air passes through the HVAC system (e.g., the fan coil) and, optionally, upstream of the temperature control zone 150.

Optionally, some or all of the air that is drawn from room 300 to the fan coil may be exhausted from the room 300. Air that enters the fan coil 100 through air inlet 112 and is exhausted to an external source is referred to as exhaust air. Accordingly, some of the input air that enters through air inlet 112 (e.g., a bleed stream of the input air) may be exhausted as exhaust air and the remainder may be recirculated to the room 300 through air outlet 116.

It will be appreciated that the amount of fresh air and the amount of exhaust air may be about the same and optionally only up to 5%, 10%, 15%, 20% or 25% of the recirculated air may be exhausted from the room 300 and replaced by fresh air. It will be appreciated that the air that is to be exhausted may be referred to as a bleed air stream.

In such an embodiment, at least some of the bleed air is passed through the oxygen concentrator 200. If the oxygen concentrator 200 is a pressure swing oxygen concentrator, then nitrogen is removed from the bleed air stream passing through the oxygen concentrator 200 and a stream of conditioned air having an increased oxygen concentration is produced. The conditioned air may be combined with the input air (the recirculated air and/or fresh air), before being exhausted through air outlet 116. Accordingly, oxygen from air that would have been exhausted is transferred to the input air, thereby increasing the oxygen concentration of the air, before being output through air outlet 116 into room 300. It will be appreciated that the conditioned air may be introduced to the HVAC system at any location in the fan coil or upstream or downstream thereof.

Figure 5:
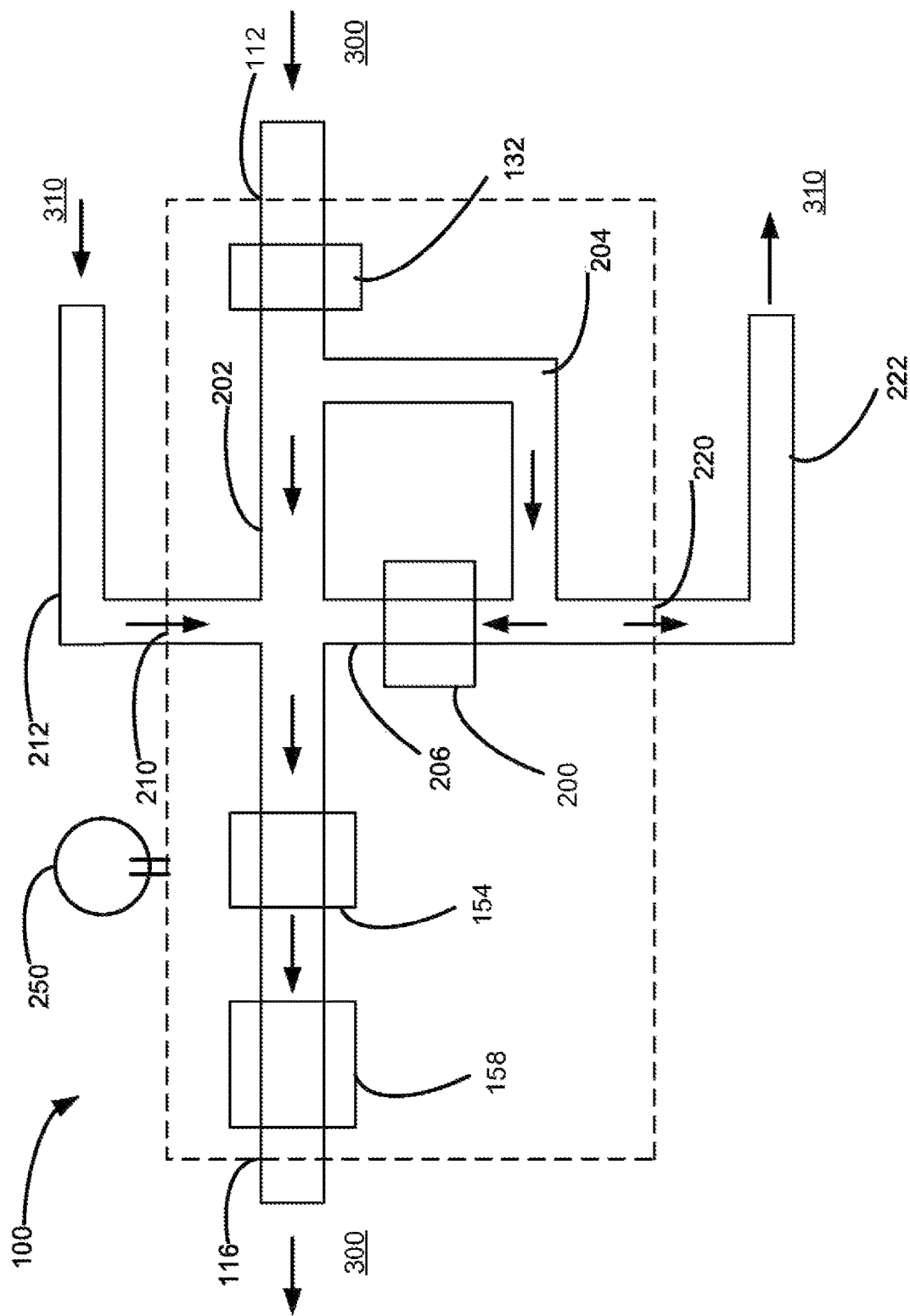
FIG. 5 is a schematic drawing of a fan coil with an oxygen concentrator operating in an oxygen enhancement mode.
Figure 6:
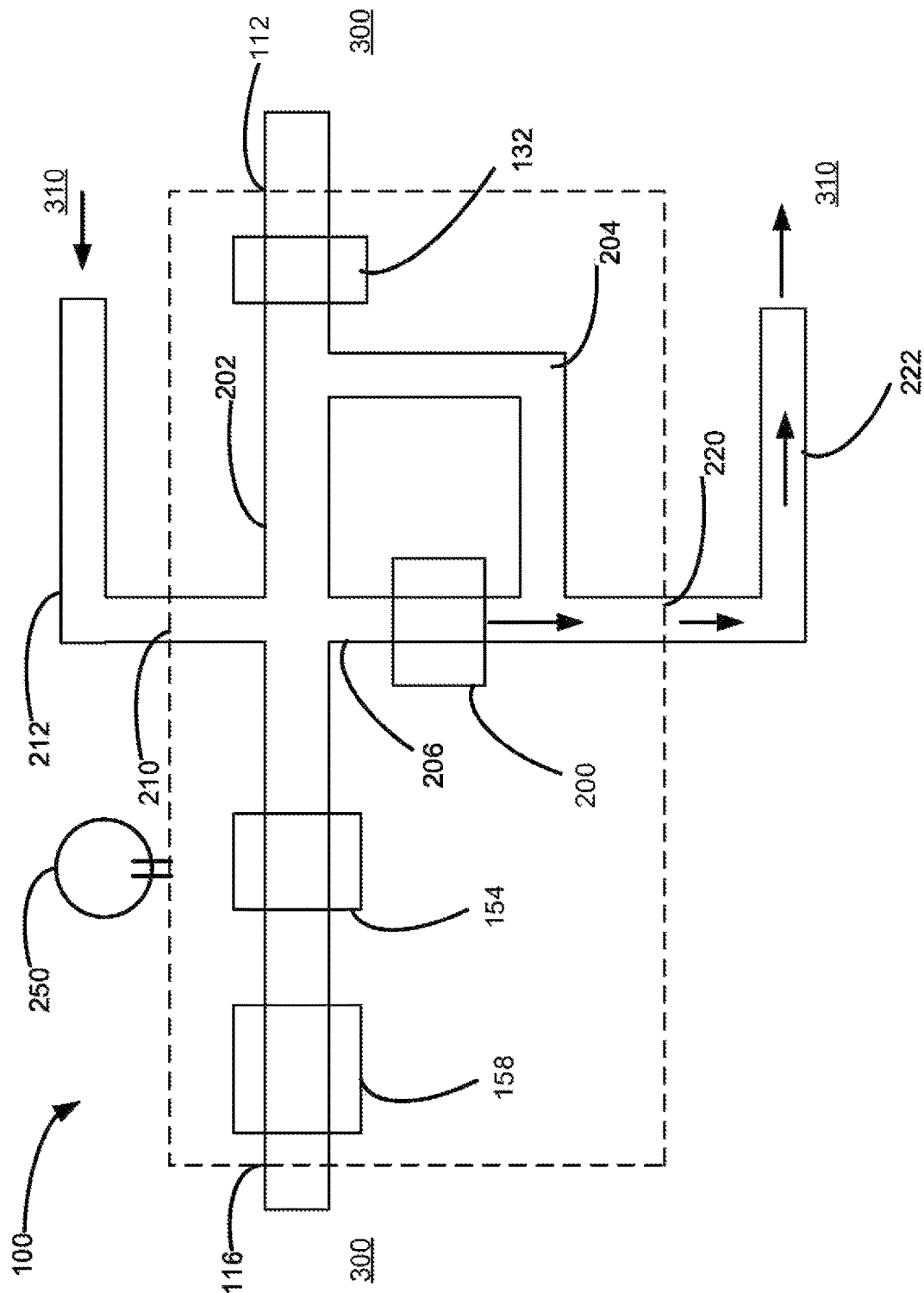
FIG. 6 is a schematic of the fan coil of FIG. 5 operating in a regeneration mode; and, FIG. 7 is a schematic of another fan coil with an oxygen concentrator operating in an oxygen enhancement mode.
Figure 7:
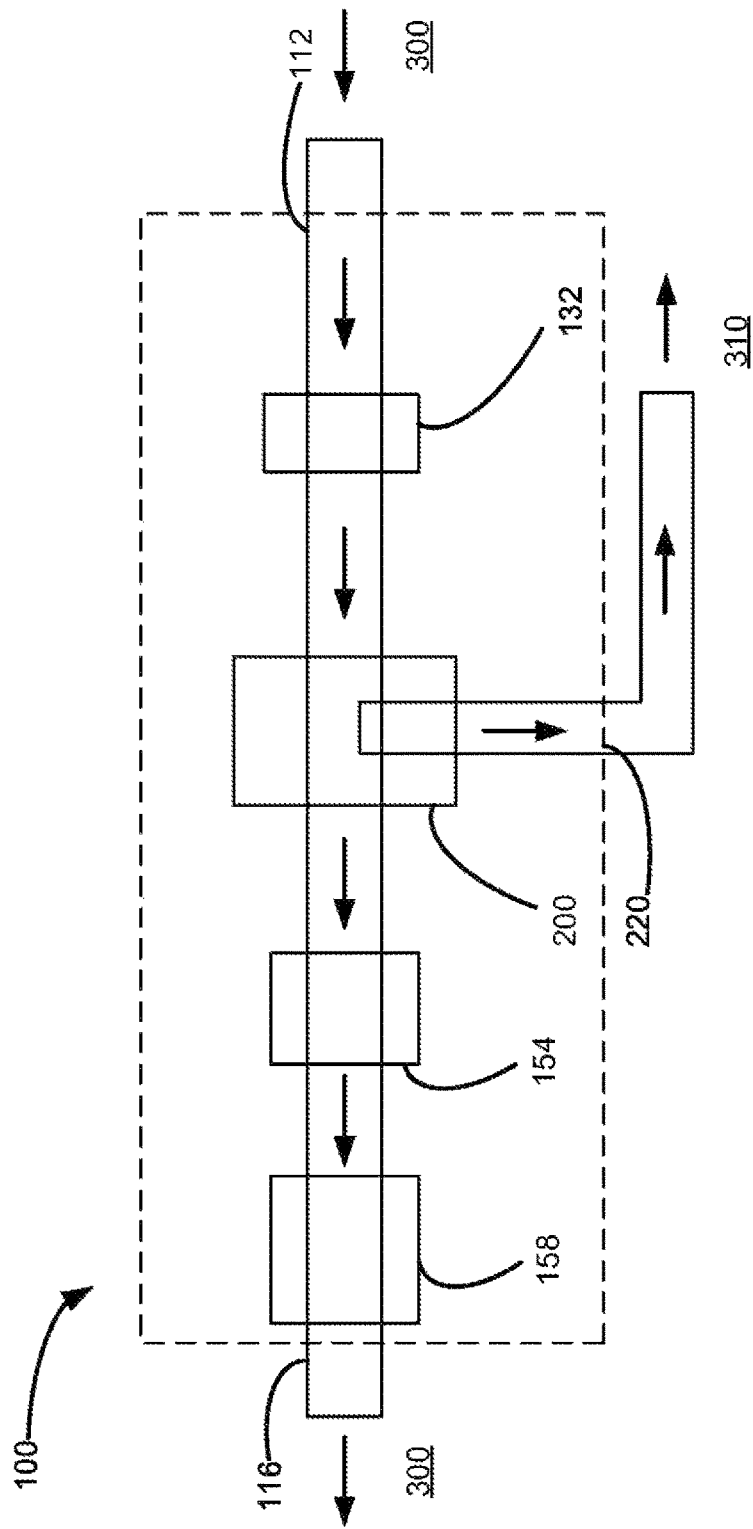
Figure 8:
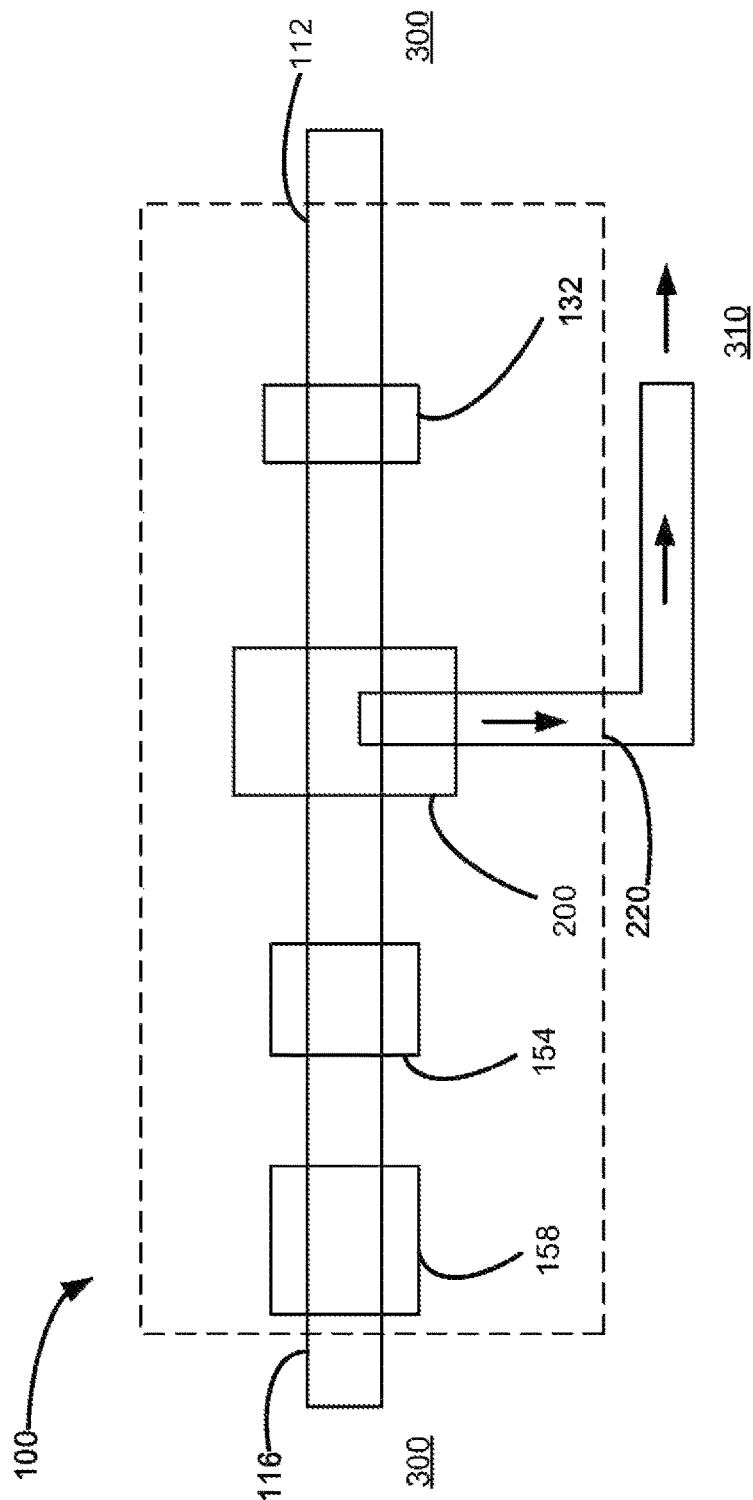
FIG. 8 is a schematic of the fan coil of FIG. 7 operating in a regeneration mode; and, FIG. 9 is a schematic drawing of a portable oxygen enrichment apparatus 400

As exemplified in FIG. 5, the fan coil 100 has an air inlet 112, an air outlet 116, a fresh air inlet port 210, and an exhaust air outlet port 220. The oxygen concentrator 200 is in flow communication with the exhaust air outlet port 220 and the fresh air inlet port 210. As shown, some of the input air (a bleed air stream) that enters through air inlet 112 enters bleed air conduit 204 and is passed through the oxygen concentrator 200, and some of the bleed air is exhausted through the exhaust air outlet port 220. The air that passes through the oxygen concentrator 200 forms conditioned air that passes through conditioned air conduit 206 and is combined with the fresh air that enters through fresh air inlet port 210, and the combined conditioned air is output through air outlet 116.

Optionally, as exemplified in FIG. 5, at least a portion of the input air that enters through the air inlet 112 may bypass the oxygen concentrator 200 and may be recirculated out through air outlet 116 into room 300. As exemplified in FIG. 5, a bypass conduit 202 allows input air from the air inlet 112 to bypass the oxygen concentrator 200 and to optionally be combined with the fresh air from the fresh air inlet port 210. Accordingly, oxygen enhanced air produced by oxygen concentrator 200 may be combined with both the fresh air that enters through fresh air inlet port 210 and the recirculated input air that entered through air inlet 112 that was not conditioned or exhausted. The combined conditioned air is then output through air outlet 116. In other words, the oxygen concentrator 200 may be in flow connection with the exhaust air by way of a bleed stream passing through bleed air conduit 204. The amount of exhaust air that is bled into the oxygen concentrator 200 may be controlled (e.g., by a valve) to vary the amount of conditioned air added to the input air. Accordingly, a valve or the like may be partially opened or closed to vary the ratio of bleed air in conduit 204 that is fed to the oxygen concentrator 200 and to the outlet port 220.

It will be appreciated that the relative flows in the fan coil 100 may be controlled by any means. For example, each conduit within the fan coil 100 may have one or more valves that are controllable to vary the flow rate into the air inlet 112, out of the air outlet 116, into the fresh air inlet port 210, out of the exhaust air outlet port 220, into the bleed air conduit, into the oxygen concentrator 200, and/or into the bypass conduit 202. Accordingly, the flow rate between each of the inlets and outlets may be controllable to vary the amount of air that is conditioned by the oxygen concentrator 200 before being output to the room 300.

Alternately, as exemplified in Figured 7 and 8, a bypass conduit 202 may not be provided. In accordance with such an embodiment, all of the air entering inlet 112 is delivered to the oxygen concentrator 200.

In some embodiments, the flow rates within the fan coil 100 may be automatically controlled. For example, as exemplified in FIGS. 5-6, the fan coil 100 may include an oxygen sensor 250. The oxygen sensor 250 may be operably connected to the oxygen concentrator 200 and/or one or more valves (e.g., a valve controlling flow to the oxygen concentrator 200) such that the oxygen concentrator 200 is actuated and/or air is flowed through the oxygen concentrator 200 and/or the amount of air provided to the oxygen concentration 200 is increased when the oxygen sensor 250 detects an oxygen level (e.g., at a location in the volume or in the air in the fan coil upstream of the oxygen concentrator 200) below a predetermined level. Similarly, when the oxygen sensor 250 detects an oxygen level above a predetermined level, the oxygen concentrator 200 may be deactivated and/or the flow of air through the oxygen concentrator 200 may be reduced or stopped. Accordingly, the air regulating device 120 may use (and may optionally incorporate) the oxygen sensor 250 to control flow rate into the oxygen concentrator 200 from the input air that enters the air inlet 112 in order to vary the amount of oxygen that is transferred from the exhaust air to the input air.

In some embodiments, the fan coil 100 may include a filter positioned upstream of the oxygen concentrator 200. Positioning the filter upstream of the oxygen concentrator 200 may improve the operation of the oxygen concentrator 200 by removing contaminates from the air prior to the air entering the oxygen concentrator 200, thereby improving the quality of air and increasing the life cycle of the oxygen concentrator 200.

In some embodiments, as exemplified in FIGS. 3-4, the fan coil 100 may include a heat exchanger 154. The oxygen concentrator 200 may be connected in flow communication the air flow path 136 (e.g., with the fresh air) upstream of the heat exchanger 154. Connecting the oxygen concentrator 200 to the air flow path 136 upstream of the heat exchanger 154 allows the conditioned air to be heated or cooled along with the optional fresh air. Furthermore, the upstream connection may more efficiently transfer heat to air that will be delivered to the room 300, without wasting energy by heating air that is to be exhausted. Similarly, the nitrogen that is removed from the air in the oxygen concentrator 200 is not heated or cooled, thereby saving energy.

For example, as exemplified in FIGS. 3-4, the air flow path 136 may include a temperature regulation zone 150 between an upstream first portion 144 of fan coil air flow path 136, and a downstream second portion 152 of fan coil air flow path 136. The temperature regulation zone 150 can include any heat exchanger 154 capable of heating and/or cooling the air moving downstream across the temperature regulation zone 150. For example, the heat exchanger 154 can include any heating or cooling apparatus such as resistive heating elements, a natural gas burner, air conditioning, or the like. In some embodiments, the air heating device 154 includes a heat recovery ventilator (HRV) unit or an energy recovery ventilator (ERV) unit that receives heat, or heat and humidity, from air that is to be exhausted for use, e.g., in treating fresh air introduced into the unit from the outside.

The oxygen concentrator 200 may be part of the HRV or ERV units.

In some embodiments, the oxygen enrichment apparatus 400 may be a stand-alone unit which only contains an oxygen concentrator 200. Alternately, the oxygen enrichment apparatus 400 may be a room air cleaner, a room air purifier, a room heater, a room air conditioner, a humidifier, a dehumidifier or a combination of one or more thereof which includes an oxygen concentrator 200. Such an oxygen enrichment apparatus 400 may be built in or it may be portable.

Figure 9:
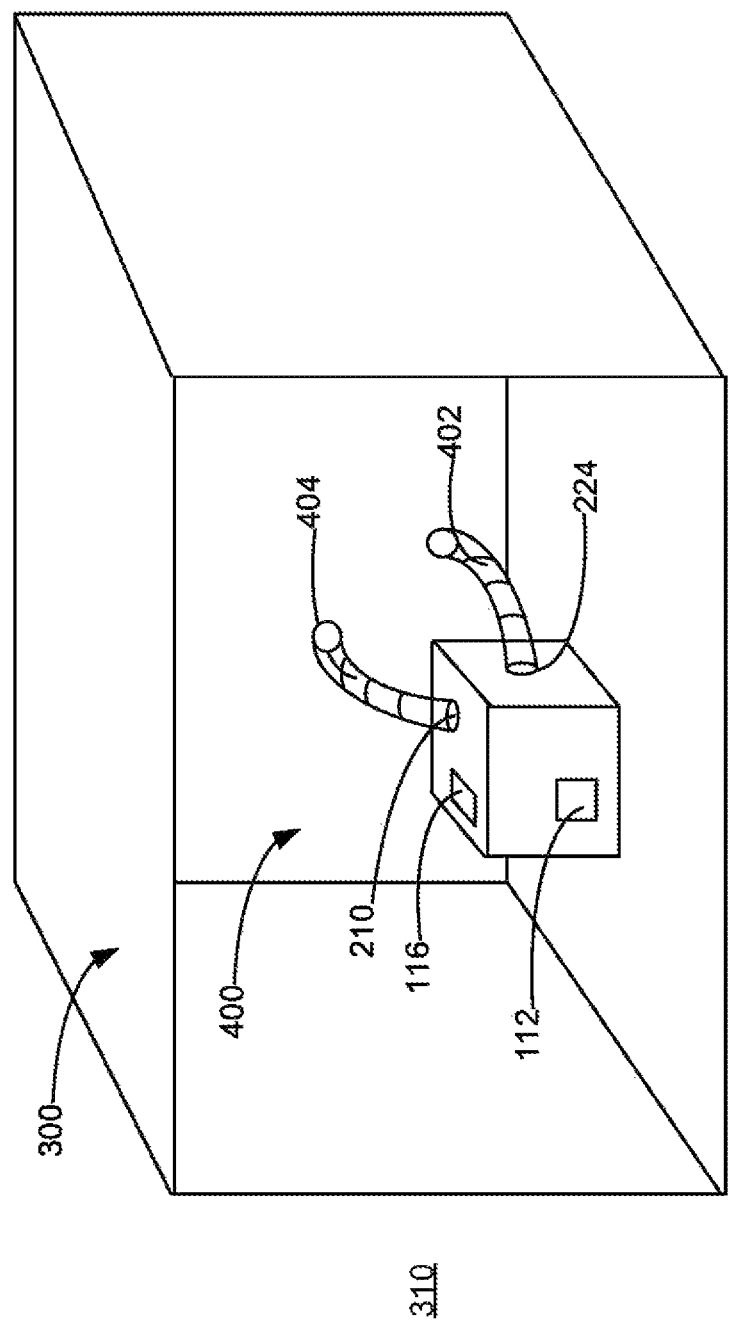

As exemplified in FIG. 9, the oxygen enrichment apparatus 400 may be a portable unit that is positioned in a living space 300. The oxygen enrichment apparatus 400 may operate in the oxygen enrichment mode wherein, as described previously with respect to fan coil 100, some or all of the air that enters inlet 112 is treated to produce an oxygen enriched air stream that is delivered to room 300 via outlet 116. During the oxygen enrichment mode, nitrogen may be adsorbed on a zeolite material.

When sufficient nitrogen has been adsorbed, then the oxygen enrichment apparatus 400 may be operated in the regeneration mode and the nitrogen may be purged via purge vent 224. The oxygen enrichment apparatus 400 may be operated in the regeneration mode when positioned in the room 300. In such a case, the oxygen enrichment apparatus 400 may be in communication with the exterior area 310 by a conduit, e.g., a flexible tube 402, that extends, e.g., through a wall or window of the room 300.

For example, the oxygen enrichment apparatus 400 may be installed on a wall or a window of room 300 using a wall mount and/or a window mount. Mounting the fan coil 100 to a window or wall allows a user to connect an optional fresh air inlet port 210 to the location 310 exterior to the living space 300 via, e.g., a flexible tube 404, that extends, e.g., through a wall or window of the room 300. Similarly, the exhaust air outlet port 220 of the oxygen enrichment apparatus 400 may be connected to the location 310 exterior to the living space 300 via flexible tube 402. This connection allows a user to run the oxygen enrichment apparatus 400 in both the oxygen enriching mode and the regeneration mode without the need to bring the fan coil 100 to the location 310. Accordingly, the oxygen enrichment apparatus 400 may automatically enter the regeneration mode when required. It will be appreciated that such an embodiment may be used with an oxygen concentrator 200 that continuously exhausts oxygen reduced air.

Alternately or in addition, the oxygen enrichment apparatus 400 may be transported (e.g., carried) to the exterior area 310 when the oxygen enrichment apparatus 400 is to be run in the regeneration mode. In other words, to purge the nitrogen that was adsorbed by the oxygen concentrator 200, a user may bring the oxygen enrichment apparatus 400 out of the living space 300 to release the nitrogen. It will be appreciated that, when in the regeneration mode, the nitrogen may be purged from the air outlet 116 or may be purged through a purge vent 224.

Multi-Unit Building HVAC System Using a Closed Loop Intermediary Heat Transfer Fluid In accordance with this aspect, an intermediary fluid is used to transfer heat between a high pressure riser stack 1120 and a fan coil in a unit 1020. This aspect may be used by itself or in combination with one or more aspects set out herein. An advantage of this aspect is that a limited amount of low pressure fluid (optionally a liquid) may be conveyed throughout a floor of a building such that high pressure fluid (the stack fluid 1122) is located only within the riser stack 1120 and therefore there is less risk of a leak of high pressure fluid, and, in case of a leak, the leak may be located at the riser stack 1120 at which location an appropriate drain and/or containment chamber may be provided to contain the leak.

Figure 10:
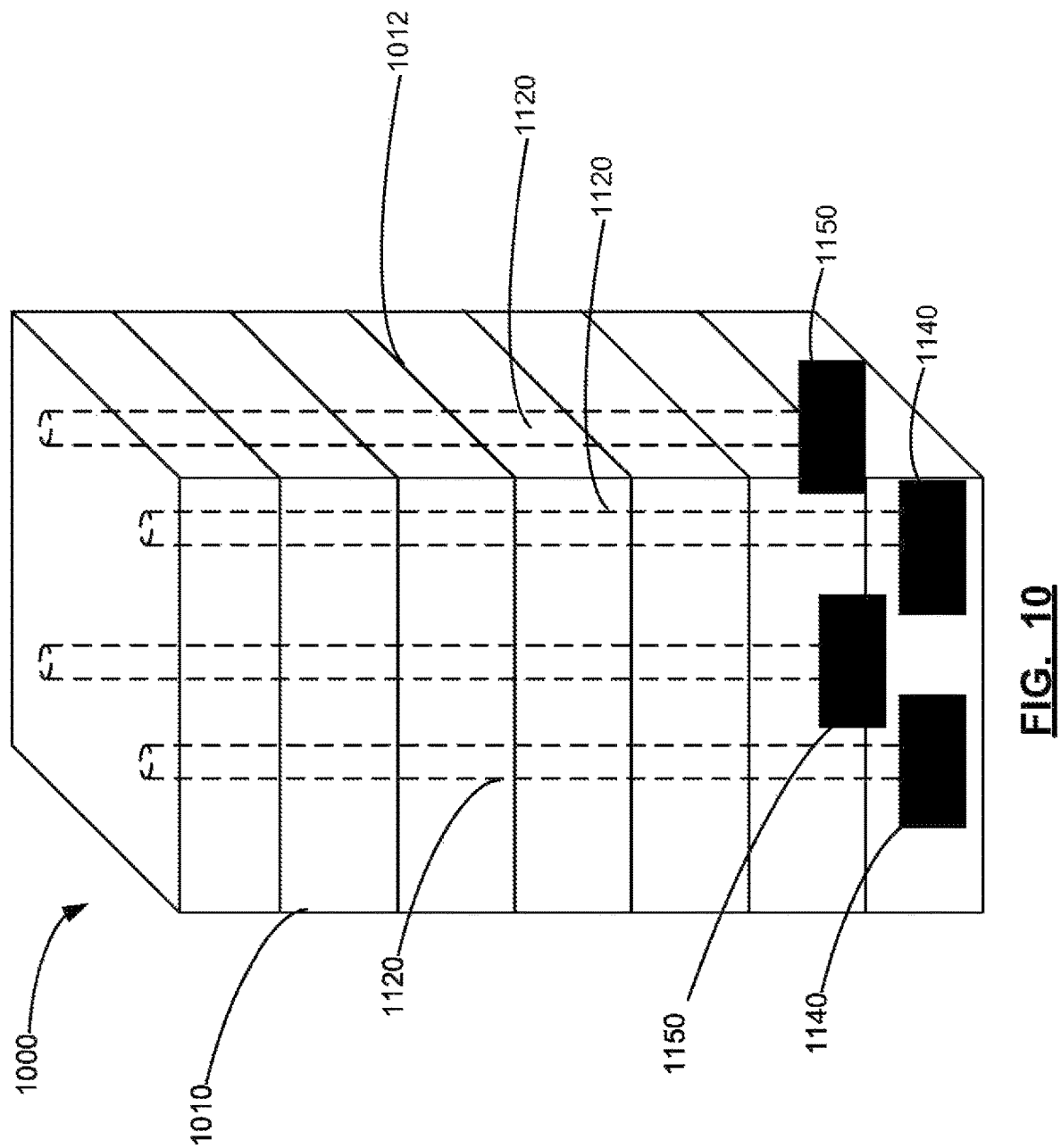
FIG. 10 is an exemplary embodiment of a building having multiple risers.

Referring to FIG. 10, an exemplary embodiment of a multi-unit building HVAC system is shown generally as 1000. The following is a general discussion of system 1000, which provides a basis for understanding several of the features that are discussed herein. As discussed subsequently, each of the features may be used individually or in any particular combination or sub-combination in this or in other embodiments disclosed herein.

Embodiments described herein include an HVAC system 1000 for use in a building 1010. In accordance with this aspect, which may be used by itself or in combination with one or more other aspects, the HVAC system 1000 is used in the building 1010 that includes a plurality of units 1020 and at least one riser stack 1120. For example, each unit 1020 may be a condominium and the plurality of units may form a condominium block. Alternately, each unit may be an office having multiple rooms or a single large room. It will be appreciated that HVAC system 1000 may be used in any building wherein a single source of heating and/or cooling fluid is used to provide heating and/or cooling to multiple individual units.

A riser fluid 1122 that may be under high pressure is circulated within a riser stack 1120. Each riser stack 1120 operates with the riser fluid 1122 under pressure such that the riser fluid 1122 is transferred up each riser stack 1120 to each floor 1012 of the building 1010. The pressure in the riser stack will depend upon the height of the building, and therefore the height to which the riser fluid 1122 must be raised. For example, the pressure of the riser fluid 1122 may be at least 100 psi, 150 psi, 200 psi or more.

It will be appreciated that the riser stack 1120 may be a single riser stack 1120 or a plurality of riser stacks 1120. For example, a building may have a single riser stack 1120 which may be used only for heating (i.e., a heated riser fluid 1122 is circulated in the riser stack 1120), only for cooling (i.e., a chilled riser fluid 1122 is circulated in the riser stack 1120) or both heating and cooling (e.g., a heated riser fluid 1122 is circulated in the riser stack 1120 in the winter and a chilled riser fluid 1122 is circulated in the riser stack 1120). Therefore, it will be appreciated that each riser 1120 may alternate between heating and cooling, depending on the seasonal use of the HVAC system 1000. Alternately, a building may have a plurality of riser stacks 1120. For example, the building may have one riser stack 1120 for heating (hot riser 1124) and one riser stack 1120 for cooling (cold riser 1126) or the building may have a plurality of hot risers 1124 and/or a plurality of cold risers 1126.

During use, the riser fluid 1122 for the heating mode is heated by a heating device 1140 and the riser fluid for the cooling mode is cooled by a cooling device 1150. For example, the heating device 1140 may be a boiler or furnace and the cooling device 1150 may be an air conditioner.

The HVAC system 1000 includes a plurality of single unit HVAC systems 1200 that are each in individual thermal communication with the riser stack(s) 120 via one or more closed loop fluid flow paths 1260. An advantage of this design is that the high pressure riser stack(s) 120 may be isolated from the individual single unit HVAC systems 1200. Accordingly, heat transfer between the riser stack 1120 and a single unit may occur with a low pressure heat transfer system, thereby reducing the likelihood of damage to the unit 1020 and/or building 1010 as a result of leakage of the single unit HVAC system 1200. For example, the closed loop fluid flow path 1260 that conveys heat between the high pressure riser stack(s) 120 and the fan coil in a single unit may be at a low pressure and may also use a relatively small amount of fluid. Accordingly, if a leak were to occur in the closed loop system, then a limited amount of fluid would be released, which would be at a lower pressure.

Each riser stack 1120 is in thermal communication with one or more single unit HVAC systems 1200 on each floor 1012 of the building 1010. For example, a single riser (or a pair of hot riser 1124 and cold riser 1126) may be used to heat or cool a single unit 1020. Alternately, a single riser (or pair of hot riser 1124 and cold riser 1126) may be used to heat or cool a plurality of units 1020. If a plurality of riser stacks 1120 (or a plurality of pairs of hot risers 1124 and cold risers 1126) are provided, then they may be distributed at different locations on a floor as is exemplified in FIG. 10.

Accordingly, each single unit HVAC system 1200 can be heated and/or cooled by the riser stack(s) 120 through the use of a plurality of heat exchangers. For example, as exemplified in FIG. 12, the single unit HVAC system 1200 has a first heat exchanger 1220 thermally connecting the riser stack and the closed loop fluid flow path 1260, and a second heat exchanger 1222 thermally connecting the closed loop fluid flow path 1260 to a fluid distribution system 1240 within the unit 1020. The fluid distribution system 1240 may also be referred to as the distribution flow path 1240. The closed loop fluid flow path 1260 extends between the first heat exchanger 1220 and the second heat exchanger 1222. The closed loop fluid flow path 1260 may also be referred to as a sub-loop 1260. The first heat exchanger 1220 exchanges heat between the riser stack fluid 1122 and a closed loop fluid 1262 in the closed loop fluid flow path 1260, while the second heat exchanger 1222 exchanges heat between the closed loop fluid 1262 and a distribution fluid 1242 of the fluid distribution system 1240. The closed loop fluid 1262 may also be referred to as a modulation fluid 1262 as it modulates the temperature of the distribution fluid 1242 via, e.g., one or more fan coils 100 provided in the unit 1020. As exemplified in FIG. 15, the portion of the closed loop fluid flow path 1260 that travels within a fan coil 100 may be referred to as a modulation fluid flow path 1320.

It will be appreciated that any heat exchanger may be used. For example, the heat exchanger may be a counter current indirect heat exchanger. Alternately, the first heat exchanger 1220 may be the closed loop fluid flow path 1260 wrapped around the riser stack 1120.

During use in a heating cycle, for example, the first heat exchanger 1220 is used to pass heat from the riser stack 1120 to the closed loop fluid flow path 1260 thereby heating the closed loop fluid 1262 to produce heated closed loop fluid 1262. The second heat exchanger 1222 draws heat from the heated closed loop fluid 1262 and passes the heat to the distribution fluid 1242 in the distribution fluid system 1240. The heated distribution fluid 1242 is then exhausted into the unit 1020 to heat the unit 1020. It will be appreciated that the same operation may be used to cool the unit 1020, using the cooled riser 1120.

The closed loop fluid 1262 may operate at a relatively low pressure within each unit 1020 in the building 1010 such that the higher pressure system of the riser stacks 1120 is isolated from the low pressure system within each unit 1020 in the building 1010. Operating the closed loop fluid 1262 at a low pressure may reduce the risk of leakage in the sub-loop 1260. If a leak does occur, the leak may expel a relatively small volume of the closed loop fluid 1262, thereby reducing damage to the unit. For example, the closed loop fluid 1262 may be at a pressure of up to 50 psi, optionally up to 30 psi or optionally in the range of about 5 to about 15 psi.

The closed loop fluid flow path 1260 may have a relatively low volume of closed loop fluid 1262. For example, the closed loop fluid flow path 1260 may utilize 1-200 L, optionally 2-100 L, or optionally 5-30 L. Accordingly, in the event of a leak, the damage caused by the closed loop fluid 1262 may be minimized due to the low volume of fluid 1262 in the sub-loop 1260.

The closed loop fluid 1262 may be any fluid capable of transferring heat between the riser fluid 1122 and the distribution fluid 1242. For example, the closed loop fluid 1262 may be a liquid, and optionally may be water. It will be appreciated that the closed loop fluid may not be buffered the same way that the riser fluid may be buffered.

Similarly, the distribution fluid 1242 may be any fluid capable of transferring heat between the closed loop fluid 1262 and the unit 1020 of the building 1010. For example, the distribution fluid 1242 may be a gas, and optionally may be air.

It will be appreciated that the closed loop fluid flow path 1260 may be any size, shape, and/or material to distribute the closed loop fluid 1262 throughout the closed loop flow path 1260. For example, the closed loop fluid flow path 1260 may comprise or consist of a conduit 1264 having a wall thickness in the range of about 0.01 to about 0.06 inches, optionally 0.02 to 0.04 inches. The conduit 1264 may be made of metal. The thin wall thickness and metal material may improve the thermal communication between the closed loop fluid flow path 1260 and the heat exchangers 1220, 1222 to transfer heat more efficiently between the riser fluid 1122 and the closed loop fluid 1262 and between the closed loop fluid 1262 and the distribution fluid 1242.

Figure 11:
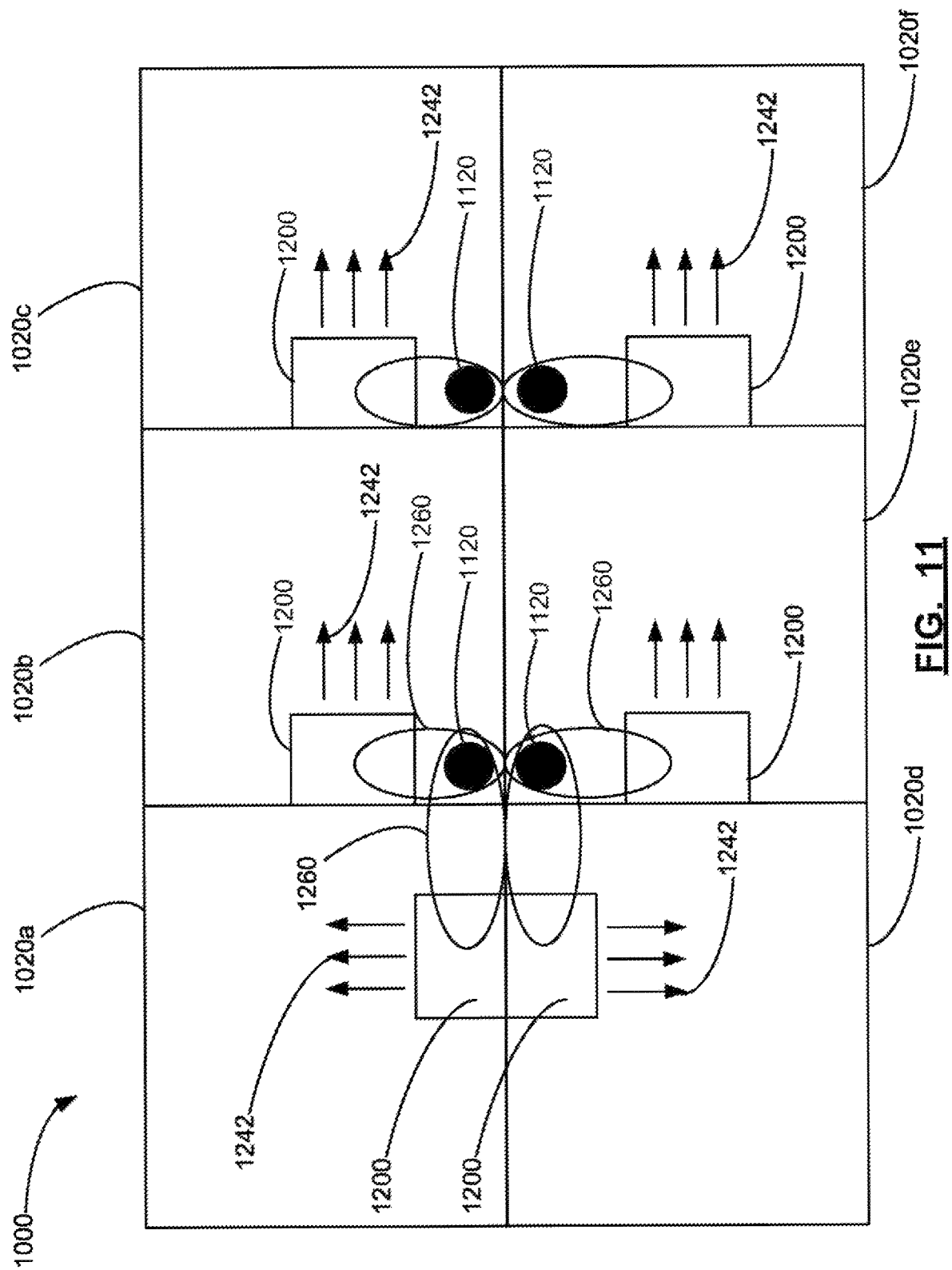
FIG. 11 is a floor plan of the building of FIG. 1 exemplifying multiple units on the floor, each of which has its own HVAC system and closed loop flow path.

Referring to FIG. 11, as exemplified, the floor in the building has a plurality of units 1020. One or more riser stacks 1120 is thermally coupled to single unit HVAC systems 1200. It will be appreciated that one or more closed loop fluid flow paths 1260 may thermally connect a single unit 1020 to one or more riser stacks 1120 and each single unit HVAC systems 1200 may comprise one or more fan coils (or at least a heat exchanger) that is thermally connected to the one or more closed loop fluid flow paths 1260.

As exemplified in FIG. 11, each unit 1020 has its own respective single unit HVAC system 1200. Accordingly, for example, the first single unit HVAC system 1200 provides temperature regulation to the first unit 1020a, the second single unit HVAC system 1200 provides temperature modulation to the second unit 1020b, and so on. Each unit 1020a, 1020b is schematically shown as a single room, although each unit may have any number of rooms.

In some embodiments, each unit 1020 may be thermally coupled to its own respective riser(s) 120. Alternately, or in addition, a plurality of units 1020 may share one or more risers 1120. In other words, the riser stacks 1120 may be exterior to the unit 1020 with the closed loop fluid flow path 1260 providing thermal communication from the exterior riser stack 1120 to within the unit 1020. For example, as exemplified in FIG. 11, there are six units 1020a-f and four riser stacks 1120. Units 1020b and 1020e share the riser stacks 1120 with units 1020a and 1020d respectively, while units 1020c and 1020f each have their own riser stacks 1120. Accordingly, the design of the building 1010 may be simplified since fewer riser stacks 1120 are needed to provide thermal energy (heating and/or cooling) to every unit 1020 on the floor 1012. Reducing the number of riser stacks 1120 may reduce the likelihood of leakage, while also simplifying construction of the building 1010. It will be appreciated that the configuration may vary depending on the floor layout of the units 1020 in the building 1010.

Figure 13A:
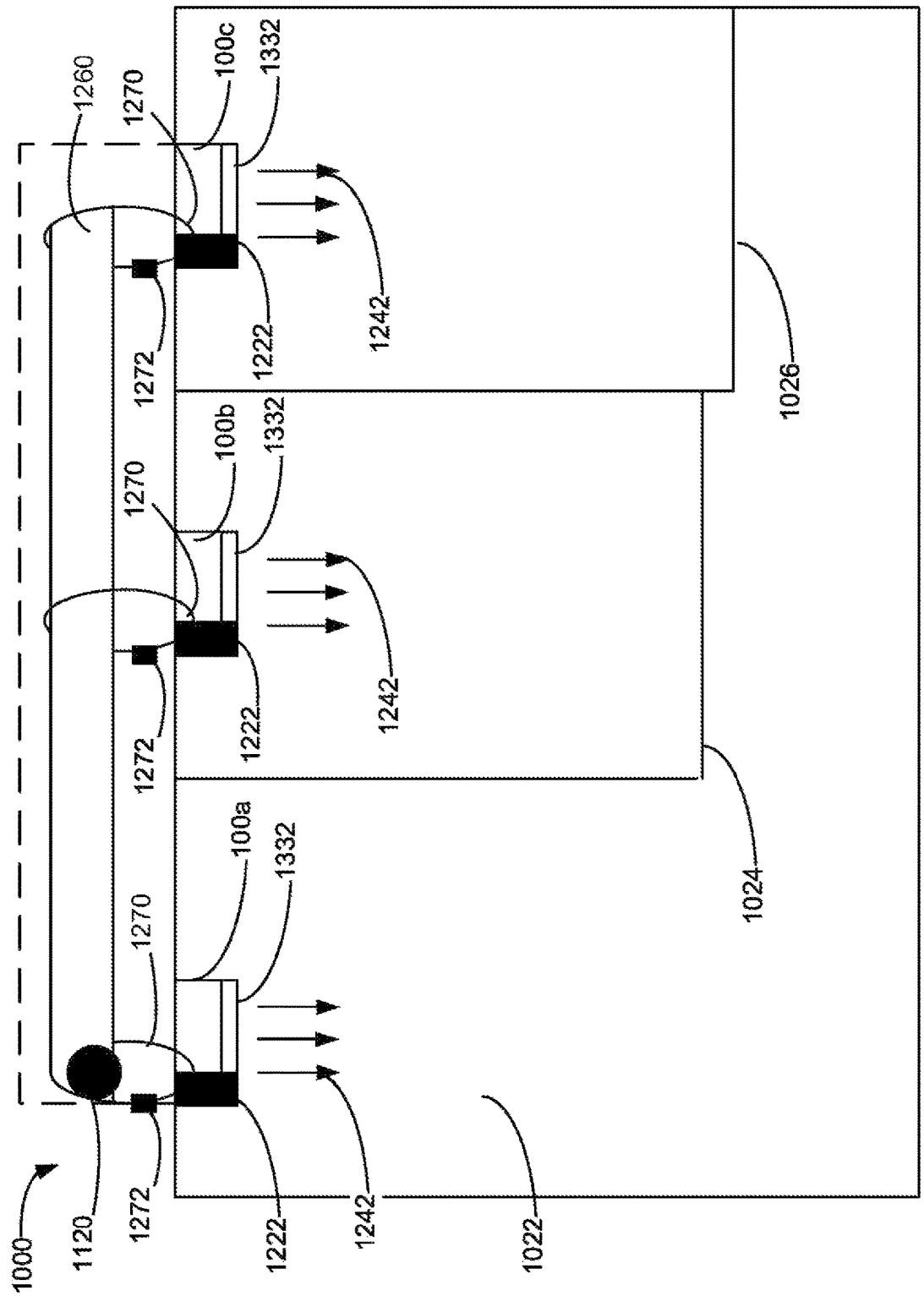
FIG. 13A is a floor plan of a single unit with a single unit HVAC system comprising three fan coils.

The single unit HVAC system 1200 may include more than one heat exchanger 1220 and more than one heat exchanger 1222. For example, if a unit 1020 has more than one room, then a heat exchanger (fan coil) may be provided for each room or as discussed subsequently, a heat exchanger (fan coil) may be provided in a wall that separates two rooms and the heat exchanger (fan coil) may heat and/or cool both rooms. Referring to FIG. 13A, as exemplified, the single unit 1020 includes three rooms 1022, 1024, 1026. Each room has its own respective heat exchanger for thermal communication with the sub-loop 1260, the sub-loop 1260 being in thermal communication with one or more risers 1120. In other words, the first room 1022 has a second heat exchanger 1222, the second room 1024 has a different second heat exchanger 1222, and the third room has a further different second heat exchanger 1222. The second heat exchanger 1222 provides temperature modulation to the first room 1022, the second heat exchanger 1222 provides temperature modulation to the second room 1024, and the second heat exchanger 1222 provides temperature modulation to the third room 1026. Accordingly, as exemplified in FIG. 13A, the closed loop fluid flow path 1260 extends between each of the second heat exchangers 1222 and the riser 1120.

It will be appreciated that closed loop fluid flow path 1260 may be a single flow path that extends sequentially through each of the rooms 1022, 1024, 1026. Alternately, the single unit HVAC system 1200 may include a plurality of closed loop fluid flow paths 1260. For example, there may be a plurality of heat exchangers in a single unit 1020, such as a heat exchanger for each room in the unit 1020. Each heat exchanger may be in thermal communication with the same closed loop fluid flow path 1260 or may have its own respective closed loop fluid flow path 1260 in thermal communication with the riser stacks 1120. For example, the closed loop fluid flow path 1260 may have one or more splitters to subdivide the closed loop fluid flow path 1260 that extend to one or two of the rooms 1022, 1024, 1026 prior to returning to the riser stack 1120. For example, a single line may enter unit 1020a and then split into three lines, one which extends to second heat exchanger 1222 in room 1022, a second that extends to second heat exchanger 1222 in room 1024 and a third that extends to second heat exchanger 1222 in room 1026. Downstream of the second heat exchangers 1222, the three lines may merge to form a single line that returns to the riser stack 1120.

Alternately, each room need not have its own respective heat exchanger. For example, a single unit HVAC system 1200 may have a single fan coil 100 and the distribution flow path 1240 may comprise a ducting system that extends from the single fan coil 100 as is known in the art. Accordingly ducting for air (or a conduit for a liquid) may extend from the single fan coil 100 to each room in the unit 1020.

Figure 13B:
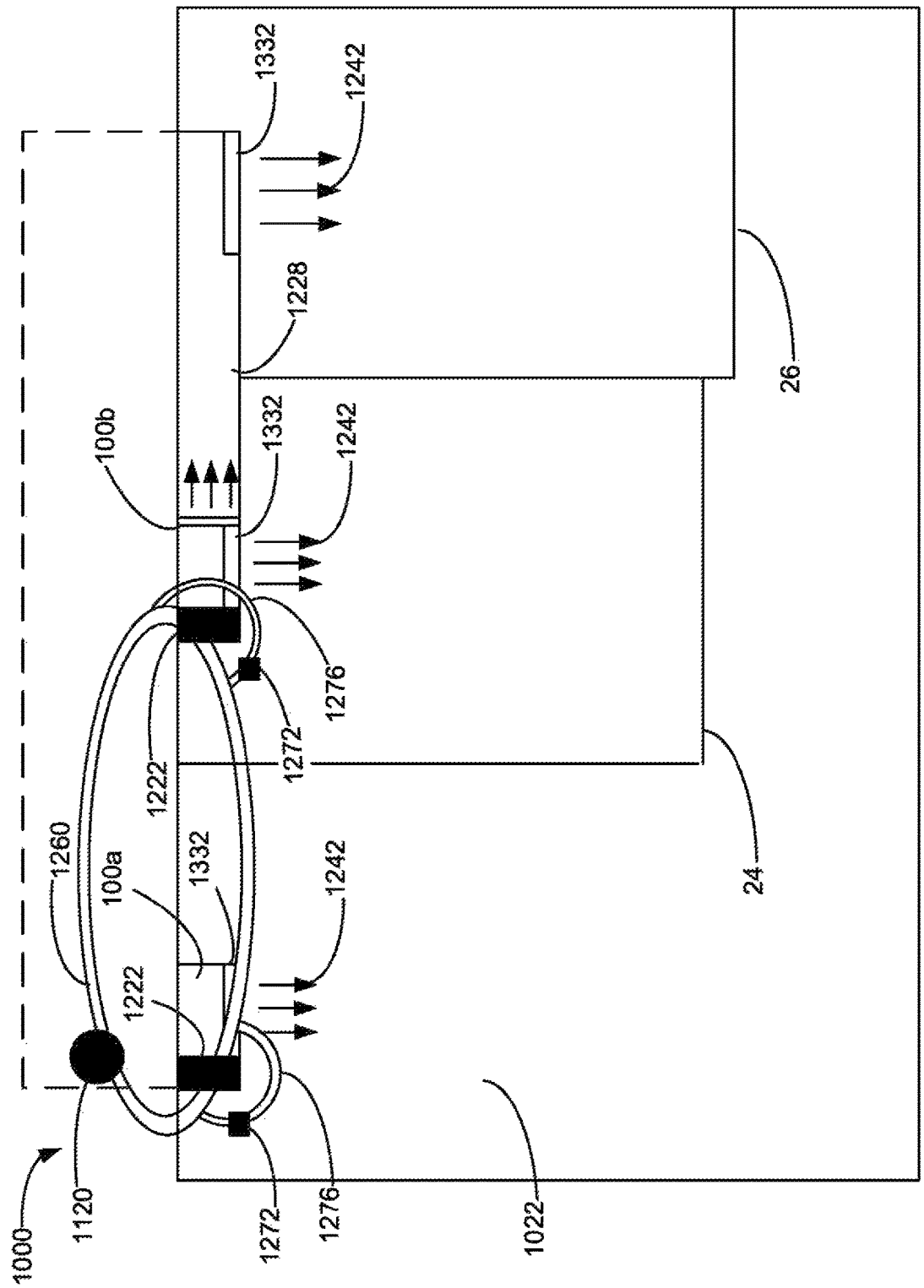
FIG. 13B is a floor plan of a single unit with a single unit HVAC system comprising two fan coils.

Alternately, a single unit HVAC system 1200 may have more than one fan coil 100 but fewer fan coils 100 than rooms in the unit. For example, as exemplified in FIG. 13B, single unit HVAC system 1200 comprises only two fan coils 100a, 100b. Accordingly, a fluid conduit 1228 (e.g., ducting for air), which is part of the distribution flow path 1240, extends between heat exchanger 1222 (fan coil 100b) and room 1026. Accordingly, a single heat exchanger may be used to distribute the distribution fluid 1242 to a plurality of rooms. While a single riser 1120 is exemplified, it will be appreciated that the same layout of heat exchangers may be used for a plurality of risers 1120 (e.g., separate hot and cool risers).

Leak Reduction and Detection for the Riser Stack

In accordance with this aspect, a riser stack 1120 is positioned and/or constructed to limit the extent of riser fluid 1122 leaking should the riser stack 1120 leak and/or the one or more leak detectors may be provided. This aspect may be used by itself or in combination with one or more aspects set out herein. An advantage of this aspect is that a riser stack 1120 may be provided interior a liner and/or in a room with a catch basin and a drain such that, should a leak occur, the leak may be maintained.

For example, as exemplified in FIG. 12, the one or more riser stacks 1120 in the building may be provided interior of a liner conduit 1128. The liner conduit 1128 may be in flow communication with a drain 1130, so that in the event of a leak in the riser stack 1120, the liner conduit 1128 may direct leaked fluid 1122 to the drain 1130. Accordingly, damage to the building 1010 may be reduced if a leak occurs. An advantage of this design is that if there is a leak of the high pressure riser fluid 1122, the leak is contained within the liner conduit 1128 and directed out the drain 1130 to prevent damage to the units 1020 in the building 1010. It will be appreciated that a single drain 1130 may be provided at the bottom of the riser stack 1120. Alternately, a 130 drain may be provided on each floor.

It will be appreciated that a drain 1130 may not be provided. For example, the liner may extend to the bottom (e.g., basement) of a building where the heating/cooling source is located.

Alternately, a liner 1128 may not be provided. Instead, each floor may have a catch basin surrounding the riser stack 1120 and the catch basin may have a drain 1130.

Alternately to the liner and or catch basin, the HVAC system 1000 may have a riser leak detector 1132. The riser leak detector 1132 may be used to issue a signal that terminates flow in the riser stack 1120 upon a leak in the riser stack 1120 being detected. In the event of a leak, the riser fluid 1122 may be shut off rapidly to prevent damage to the building 1010. It will be appreciated that any riser leak detector 1132 may be used, including, but not limited to, a float switch, a conductivity sensor, and a capacitance leak detector. The riser leak detector 1132 may issue a signal to, e.g., a solenoid, which closes a valve thereby terminating flow in the riser stack and/or which shuts off a pump that circulates the riser fluid 1122. It will be appreciated that instead of, or in addition to, shutting off the flow of riser fluid 1122, the riser leak detector 1132 may issue a signal to warn a user that there is a leak.

Alternately or in addition, the HVAC system may have a closed loop leak detector 1266. The closed loop leak detector 1266 may be used to issue a signal that terminates flow in the closed loop fluid flow path 1260 upon a leak in the closed loop fluid flow path 1260 being detected (e.g., a valve 1268 may be shut, see for example FIG. 12). It will be appreciated that any closed loop leak detector 1266 may be used, including, but not limited to, a float switch, a conductivity sensor, and a capacitance leak detector. The closed loop leak detector 1266 may issue a signal to, e.g., a solenoid, which closes a valve thereby terminating flow in the closed loop 1260 and/or which shuts off a pump that circulates the closed loop fluid 1262. It will be appreciated that instead of, or in addition to, shutting off the flow of closed loop fluid 1262, the closed loop leak detector 1266 may issue a signal to warn a user that there is a leak.

Alternately or in addition, the HVAC system 1200 may have a closed loop high pressure sensor. The closed loop high pressure sensor may issue a signal that terminates flow in the closed loop fluid flow path 1260 upon a high pressure condition being detected. A high pressure in the closed loop flow path 1260 may be indicative of a blockage in the closed loop fluid flow path 1260. Accordingly, the high pressure sensor may be used to provide an alert that there is a blockage and indicate that the closed loop fluid flow path 1260 needs maintenance. Providing early maintenance in the event of a blockage may prevent a leak from occurring, thereby preventing damage to the building 1010.

It will be appreciated that, at the riser stack 1120, a fluid which leaks may be the riser fluid 1122 or the closed loop fluid 1262. Due to the treatment of riser stack fluid 1122, riser stack fluid 1122 will typically have greater electrical conductivity to the closed loop fluid 1262. Accordingly, a capacitance leak detector may be used to terminate the flow in the riser stack 1120 or the closed loop fluid flow path 1260 depending upon the capacitance of the fluid that leaks. For example, upon occurrence of a leak, the capacitance leak detector may issue a signal that terminates flow in the riser stack 1120 if the capacitance leak detector detects a fluid having a capacitance above a present capacitance that is indicative of the riser fluid 1122. Similarly, the capacitance leak detector may issue a signal that terminates flow in the closed loop fluid flow path 1260 if the capacitance leak detector detects a fluid having a capacitance below a present capacitance that is indicative of the closed loop fluid 1262. In other words, the capacitance leak detector may be used to identify which of the closed loop fluid flow path 1260 and riser stack 1120 has a leak, and once the leak source is identified, terminate flow in the identified fluid source.

Fan Coil

In accordance with this aspect, which may be used by itself or in combination with one or more other aspects, a fan coil may utilize a heat exchanger which operates at a lower pressure and therefore uses a thinner walled heat exchanger. An advantage of this design is that the fan coil may have a higher heat transfer rate between the closed loop fluid 1262 and the distribution fluid 1242.

As exemplified in FIG. 12, the second heat exchanger 1222 may be positioned within a fan coil 100. The second heat exchanger 1222 may be used to modulate the temperature of distribution fluid 1242 (e.g., air) received from within the unit 1020, using the modulation fluid (closed loop fluid) 262 that flows through a modulation fluid flow path 1320 (the portion of the closed loop fluid flow path 1260 in fan coil 100). An advantage of this aspect is that the fan coil 100 may be in thermal communication with a low volume, low pressure temperature modulation fluid 1262 (e.g., the closed loop fluid), without directly fluidly communicating with the higher pressure riser stack 1120. Accordingly, in the event of a leak, the damage may be mitigated within the building 1010 because the leak is contained by the riser stack 1120 or involves such a low volume of temperature modulation fluid 1262 that the damage is minimized. Additionally, due to the lower volume and lower pressure of the modulation fluid 1262, the conduit 1264 used to hold the modulation fluid 1262 may have a smaller diameter and a thinner wall, resulting in cheaper piping and more efficient heat exchange.

In accordance with this aspect, as exemplified in FIGS. 11-18, the single unit HVAC system 1200 has a fan coil 100 that includes the second heat exchanger 1222. The second heat exchanger 1222 operates to exchange thermal energy between the modulation fluid 1262 in the modulation fluid flow path 1320 and the distribution fluid 1242.

It will be appreciated that a fan coil 100 as referenced herein may comprise, or consist of, a second heat exchanger 1222 and a motor and fan assembly 1340. Optionally, it may include one or more of a humidifier, an air filter, and an oxygen concentrator etc. as discussed subsequently. Optionally, the second heat exchanger 1222 may be in fluid flow communication with air drawn from the exterior of the building and the fan coil 100 may include an air to air heat exchanger to heat/cool the incoming air with air exhausted to the outside.

As exemplified in FIGS. 14A and 14B, the fan coil 100 has an inlet 1330 for receiving the distribution fluid 1242 (e.g., air) from a room and an outlet 1332 for delivering the distribution fluid 1242. The outlet 1332 delivers the temperature modulated air 1242 after the distribution fluid 1242 (i.e., air from the room) has been cooled or heated by the second heat exchanger 1222. The fan coil 100 includes a first motor and fan assembly 1340 in the distribution flow path 1240. The motor and fan assembly 1340 is used to draw air 1242 from the room into the inlet 1330 and/or exhaust the temperature modulated air 1242 through the outlet 1332 back to the room.

The fan coil 100 may be designed to reduce the footprint of the single unit 1020 HVAC system 1000 within the building. For example, the fan coil 100 may be sized to fit between two wall studs 1030 (which may be positioned a standard distance apart, such as 16 inches) in the building 10, as exemplified in FIGS. 14A and 18. In some embodiments, a front side 1302 of the fan coil 100 may have a width of less than about 16 inches.

Reversing Motor and Fan Assembly

In accordance with this aspect, which may be used by itself or in combination with one or more other aspects, a fan coil 100 may include a motor and fan assembly that may be operable to direct air in a first direction and subsequently direct air in a second opposite direction. An advantage of this aspect is that the fan coil 100 may be used to recirculate air between the upper portion of a room and a lower portion of the room.

Optionally, as exemplified in FIGS. 14A-17, the unit air distribution flow path 1240 may have a lower port 1350 positioned to be adjacent a floor 1012 of the room and an upper port 1352 positioned to be adjacent a ceiling 1028 of the room. In some embodiments, the first motor and fan assembly 1340 may be a reversing motor and fan assembly that is operable in a first mode to direct air through the upper port 1352 and is operable in a second mode to direct air through the lower port 1350. Accordingly, in the first mode, the lower port 1350 functions as the inlet 1330 and the upper port 1352 functions as the outlet 1332, while in the second mode, the upper port 1352 functions as the inlet 1330 and the lower port 1350 functions as the outlet 1332.

Another advantage of this design is that the direction of air 1242 exhausted by the fan coil 100 may be adapted to account for seasonal changes in temperature. For example, the fan coil 100 may operate in a summer mode, whereby colder distribution fluid 1242 is taken from the lower port 1350 and exhausted from the upper port 1352. During summer, the air temperature at the floor 1012 is typically cooler than the air temperature at the ceiling 1028. Accordingly, by moving the cooler air from the lower port 1350 to the upper port 1352, the change in temperature between the distribution fluid 1242 and the modulation fluid 1262 is reduced, thereby resulting in a more efficient heat transfer between the modulation fluid 1262 and the distribution fluid 1242. Similarly, the fan coil 100 may operate in a winter mode, whereby hot air proximate the ceiling 1028 is returned through the upper port 1352 and exhausted through the lower port 1350. In other words, the gradation in temperature within the vertical height of the room may be utilized to exchange heat more efficiently between the distribution fluid 1242 and the sub-loop 1260.

For example, the fan coil 100 may have one or more filters for filtering the distribution fluid 1242 on the way into the fan coil 100 and/or out of the fan coil 100. As exemplified in FIGS. 15 and 16, the fan coil 100 has a first filter 1360 for filtering air entering the lower port 1350 and a second filter 1360 for filtering air exiting the upper port 1352. The filter 1360 may be any filter capable of treating the distribution fluid 1242. For example, the filter 1360 may be a cyclone and/or a physical filter media. In some embodiments, the first filter 1360 may be used in a first mode wherein air enters via a port located at that filter, while the second filter 1360 may be used in a second mode wherein air enters via a port located at that filter. A bypass valve may be used to alter the distribution fluid flow path 1240 such that one of the filters is bypassed in one or both modes.

The system may include a filter indicator that provides indication of the cleanliness of the filter 1360. For example, there may be a pressure sensor or a colour sensor, or both, that indicate when the filter 1360 is dirty and needs to be cleaned. The dirt indicator may send a signal to an electronic device, e.g., a control module wired to the system or a smart phone) indicating that the filter 1360 needs to be cleaned.

Alternately, or in addition, the fan coil 100 may include treatment devices for treating the distribution air. For example, the fan coil 100 may include a humidifier and/or a dehumidifier. The fan coil 100 may also operate to exchange the distribution fluid 1242 with a location exterior to the unit 1020. For example, the supply of distribution fluid 1242 may come from a fresh air source, such as exterior to the building 1010. The incoming air may be treated by one or more filters 1360 to improve the quality of the air entering the unit 1020. Alternately, or in addition the incoming air may be treated by a chemical conversion process to reduce potentially harmful contaminants from the incoming air. For example, the chemical conversion process may break down ozone, carbon monoxide, nitrous oxides, sulfur oxides, and/or other harmful compounds from the incoming air to improve the air quality of air entering the unit 1020.

The exhaust air may also be treated to recover beneficial components of the exhaust air, such as oxygen and/or heat. For example, the single unit HVAC system 1200 may have an exhaust heat exchanger for recovering heat from air exiting the unit 1020 and transferring the recovered heat to the incoming fresh air. The HCAC system 1200 may have an oxygen concentrator. Similar to the heat recovery, oxygen from the exhaust air may be recovered and passed to the fresh incoming air to increase the oxygen concentration of the incoming air. In other words, the heat and/or oxygen from exhaust air leaving the HVAC system 1200 may be recovered and passed to the incoming air.

Fluid Detection for the Fan Coil

In accordance with this aspect, which may be used by itself or in combination with one or more other aspects, a catch basin and optional drain may be provided to collect closed loop fluid 1262 that may leak and/or condensate that may build up in the fan coil. Alternately or in addition, one or more leak detectors may be provided for the fan coil 100.

Figure 15:
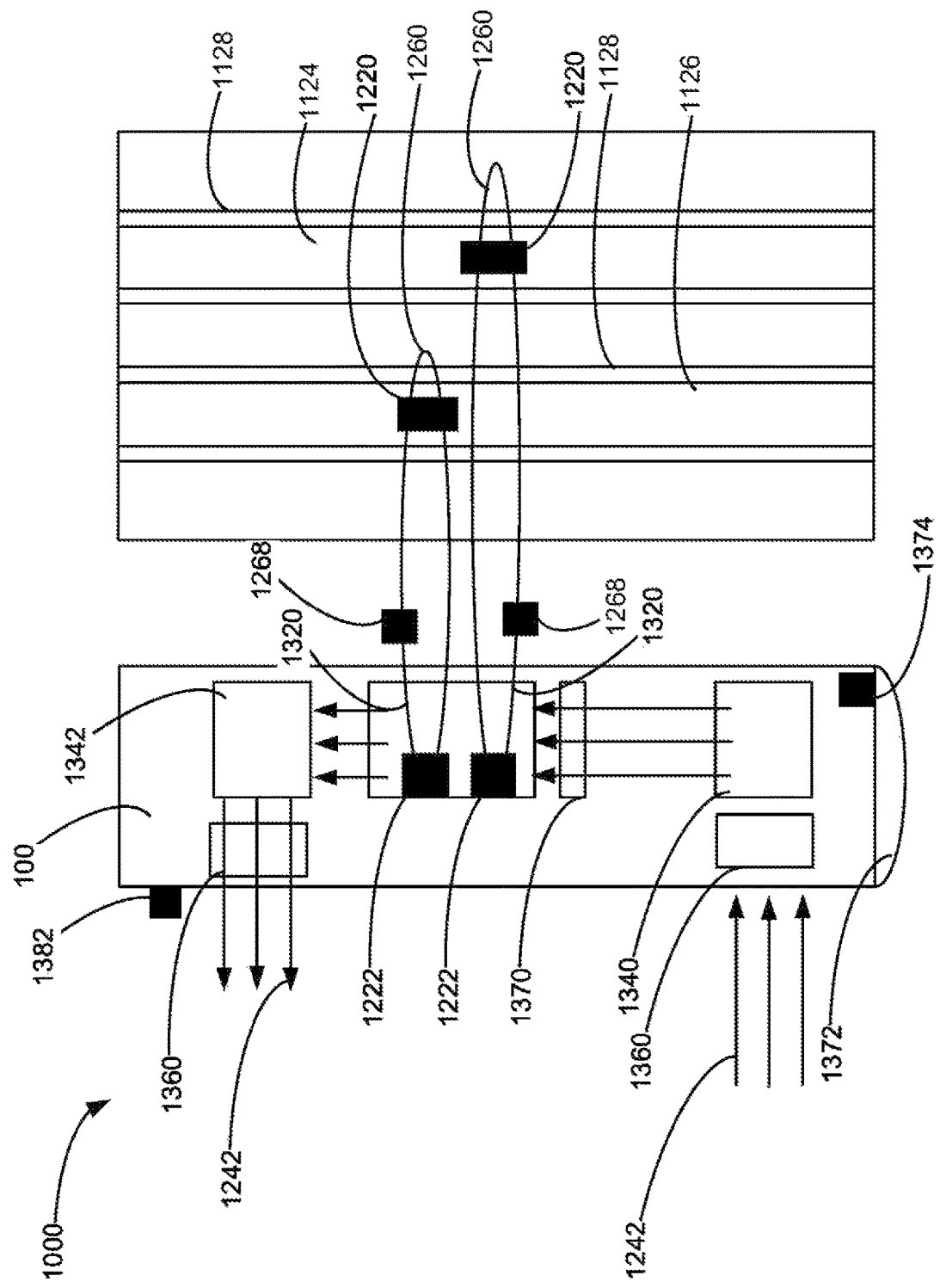
FIG. 15 is a schematic view of a single unit HVAC system in fluid communication with hot and cold risers.

As exemplified in FIG. 15, the fan coil 100 may have a catch basin 1370 for catching condensate from the heat exchanger 1222. The catch basin 1370 may be in flow communication with a drain such that collected condensate from the heat exchanger 1222 is removed from the fan coil 100 through the drain. The catch basin 1370 may include an overflow basin 1372 with a water sensor 1374 for shutting off the fan coil 100 in the event of excessive water buildup.

Optionally, the condensate may be used for cleaning any component of the fan coil 100, including, but not limited to the heat exchanger 1222 and/or the filter 1360. The filter 1360 may include a disposable element or a reusable element. For example, the filter 1360 may be washable. In some embodiments, the condensate caught by the catch basin 1370 may be used to automatically wash the filter 1360. The condensate used for washing the filter 1360 may then be purged from the HVAC system 1200 through the drain. In other words, the filter 1360 may be self-cleaning.

Fan Coil with a Plurality of Motor and Fan Assemblies

In accordance with this aspect, which may be used by itself or in combination with one or more other aspects, the fan coil 100 has a plurality of motor and fan assemblies. For example, in at least one mode, two or more motor and fan assemblies may be operated concurrently. An advantage of using two motor and fan assemblies that operate concurrently is that the power required by each motor and fan assembly to move the distribution fluid 1242 through the fan coil 100 may be reduced and Reducing the power of the noise of the fan coil 100 may be reduced.

Alternately, or in addition, each motor and fan assembly may direct air in a different direction through the fan coil 100. For example, as exemplified in FIG. 15, the fan coil 100 may further have a second motor and fan assembly 1342. The first motor and fan assembly 1340 may be operable to direct air through the upper port 1352 such that the lower port 1350 functions as the inlet 1330 and the upper port 1352 functions as the outlet 1332 and the second motor and fan assembly 1342 may be operable to direct air 1242 through the lower port 1350 such that the upper port 1352 functions as the inlet 1330 and the lower port 1350 function as the outlet 1332.

Optionally, at least one of the first motor and fan assembly 1340 and the second motor and fan assembly 1342 may be a reversing fan. In other words, the direction of distribution fluid flow 1242 induced by one or both of the first and second motor and fan assemblies 1340, 1342 may be switched. Accordingly, when one of the motor and fan assemblies 1340, 1342 is reversed, the first and second motor and fan assemblies 1340, 1342 may be operable concurrently to direct air 1242 through one of the upper and lower ports 1350, 1352. An advantage of this design is that, when the motor and fan assemblies 1340, 1342 are operating to direct air 1242 in the same direction, the power required to operate each motor and fan assembly 1340, 1342 may be reduced, while maintaining the same air flow rate and air volume in the fan coil 100. In other words, the airflow through each motor and fan assembly 1340, 1342 is reduced, without impacting the overall flowrate through the fan coil 100. Reducing the power of each of the motor and fan assemblies 1340, 1342 may reduce the noise associated with the fan coil 100. For example, the fan coil 100 may operate in the range of 15-25 dB, optionally 15-20 dB, or optionally 14-18 dB.

It will be appreciated that, in some embodiments, both of the first and second motor and fan assemblies 1340, 1342 may be reversible. Accordingly, the first motor and fan assembly 1340 may be operable in a first mode to direct air 1242 through the upper port 1352 and a second mode to direct air through the lower port 1350. Similarly, the second motor and fan assembly 1342 may be operable in a first mode to direct air 1242 through the lower port 1350 and a second mode to direct air 1242 through the upper port 1352. Each of the first and second fan and motor assemblies 1340, 1342 may be concurrently operable in each mode such that the direction of flow of the distribution fluid 1242 is the same for each of the first mode and the second mode.

Fan Coil Between Rooms

In accordance with this aspect, which may be used by itself or in combination with one or more other aspects, the single unit HVAC system 1200 may include a fan coil 100 positioned in a wall 1032 between a first room 1022 and an adjacent second room 1024. An advantage of this aspect is that a single fan coil 100 may directly moderate the temperature in two rooms without the need of HVAC ducting. Additionally, the temperature of each room may be varied by adjusting the flow from the fan coil into each room. In other words, the temperature of adjacent rooms may be controlled such that the temperature is different in each room.

Figure 17:
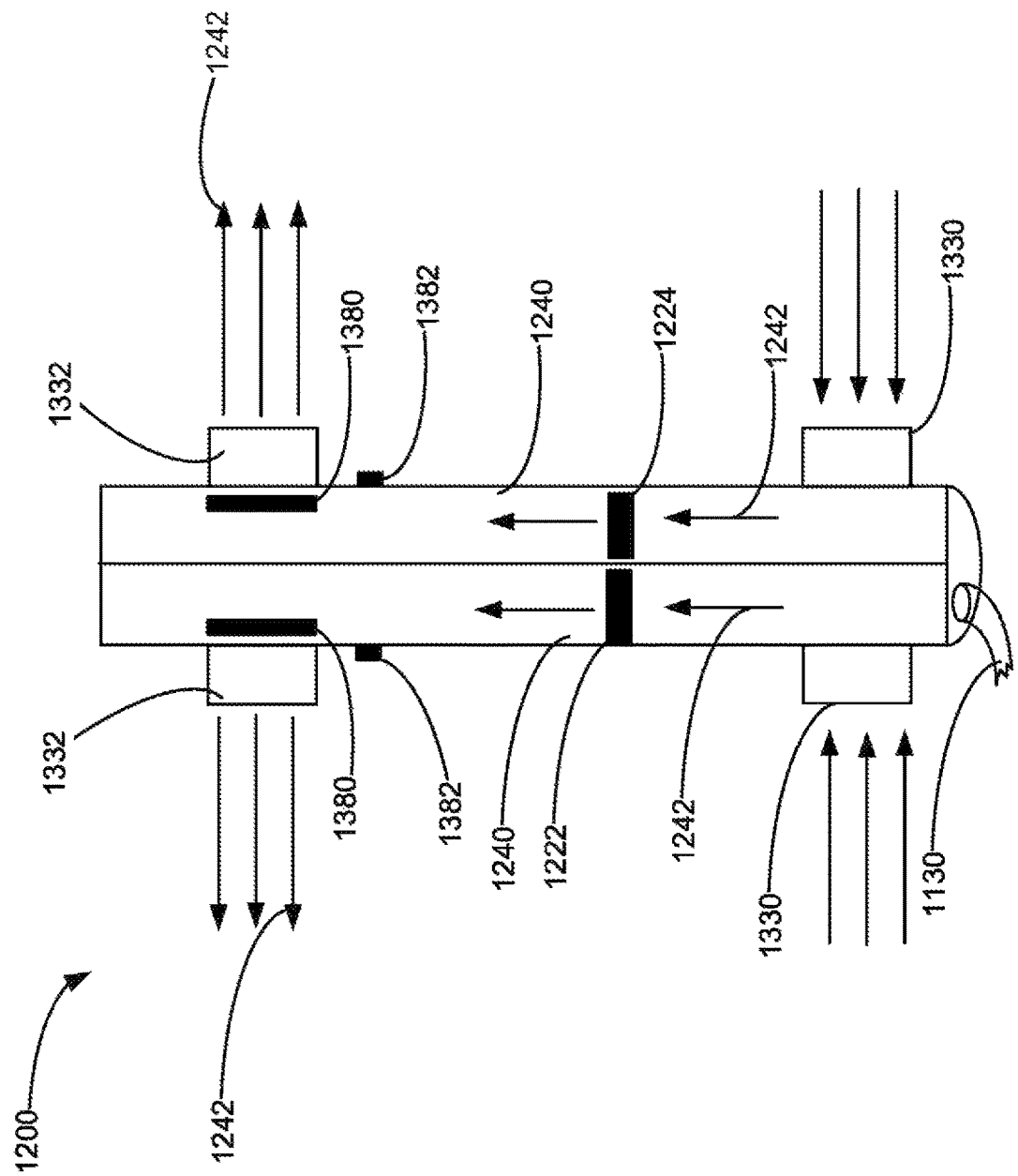
FIG. 17 is a side view of a single unit HVAC system positioned in a wall between two rooms.
Figure 18:
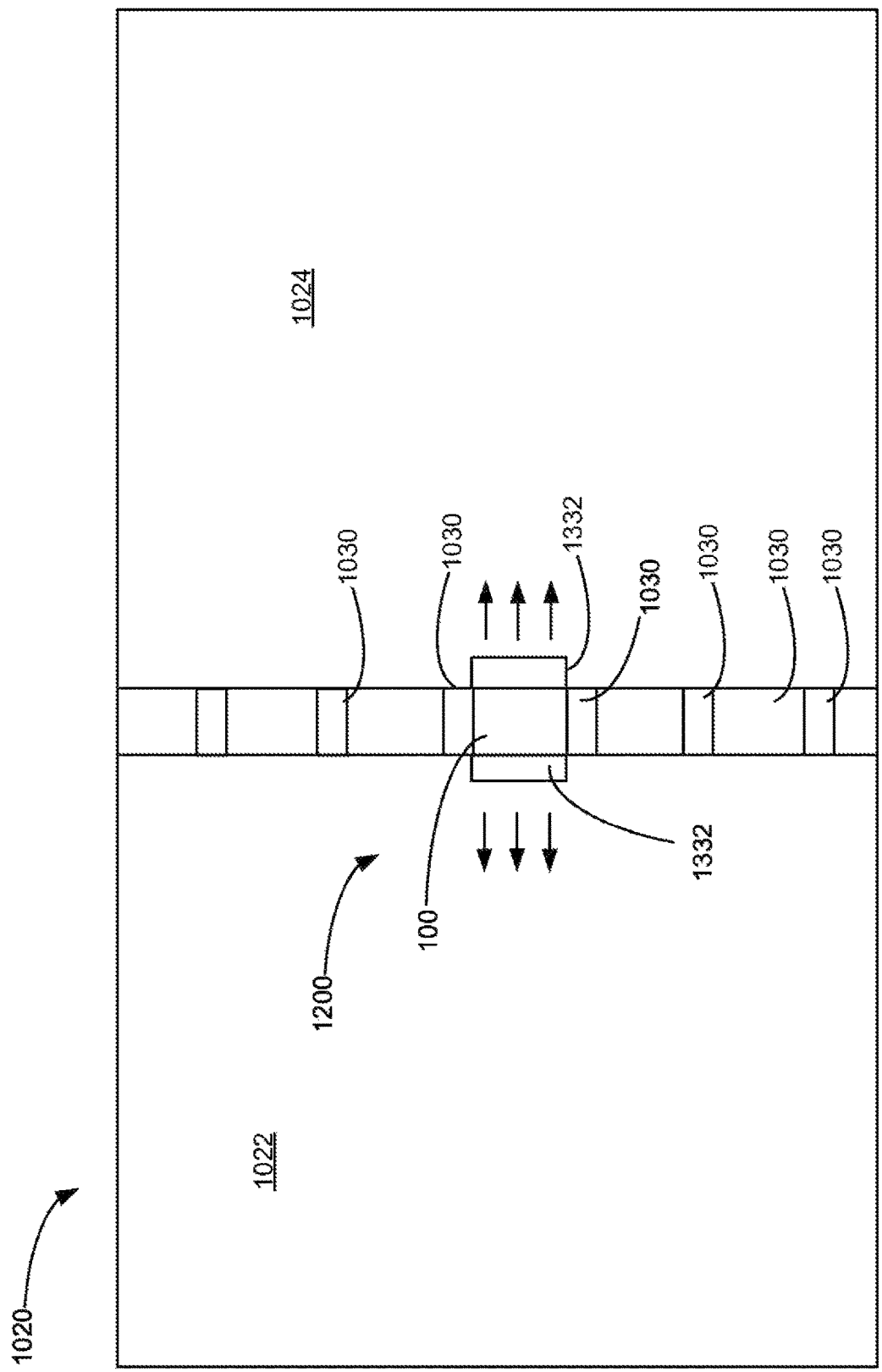
FIG. 18 is a top view of the single unit HVAC system of FIG. 8 installed in a wall between two rooms.

In accordance with this aspect, as exemplified in FIGS. 17 and 18, the fan coil 100 is positioned in the wall 1032 between the first room 1022 and the second room 1024. As shown, the fan coil 100 is optionally positioned between two studs 1030 in the wall. It will be appreciated that the studs may be a standard distance apart (e.g., 16 inches). The fan coil may have an outer casing that forms part of the wall of one or both rooms. Optionally, the fan coil 100 is positioned behind the drywall that forms the walls of the rooms.

Each room has a respective air return 1330 and air outlet 1332 from the fan coil. The fan coil 100 is in flow communication with the air return 1330 and the air outlet 1332 of each room 1022, 1024. Accordingly, distribution air 1242 may enter the fan coil 100 from one or both rooms 1022, 1024 through the air returns 1330 and may be exhausted to one or both rooms 1022, 1024 through the air outlets 1332.

One or more adjustable dampers 1380 may be used to control the distribution fluid 1242 which is exhausted to one or both of the rooms 1022, 1024. The dampers may be any design which reduces the flow of air through an air outlet 1332, such as an adjustable exit port. The damper may be manually or electronically operated, such as by a temperature sensor 1382, which senses the temperature in a room. It will be appreciated that the temperature sensor 1382 may be positioned at any location in a room. A user may set a first desired temperature for room 1022 and a different second desired temperature for room 1024. Sensors 1382 may send a signal to the damper 1380 for the room, which opens or closes the damper 1380 thereby adjusting the amount of heated or cooled distribution air 1242 that enters the room.

In another operating mode, each room may be set to the same desired temperature, but the amount of heating or cooling required by each room to achieve the common desired temperature may vary. For example, one room may be exposed to sunshine, have electronic equipment that generates heat, or it may be the kitchen. In such a case, Sensors may open and close a damper to vary the heated/cooled air entering that particular room to enable each of the rooms to achieve the desired temperature. Accordingly, for example, if room 1022 achieves the common desired temperature before room 1024, the air flow to room 1022 may be reduced or eliminated and therefore more or all of the heated/cooled distribution air 1242 may enter room 1024 until room 1024 also achieves the desired temperature.

It will be appreciated that each room, or only some of the rooms, may have a temperature sensor 1382.

It will also be appreciated that each sensor 1382 may be part of a thermostat (i.e., a room may have its own thermostat) such that a user may set the temperature for a particular room by using the sensor 1382.

Alternately, the unit 1020 may have its own central unit thermostat. The first temperature sensor 1382 and the second temperature sensor 1382 may be in communication with the unit thermostat. Therefore, the unit thermostat may be used to set a desired temperature and one or more rooms may be provided with a temperature sensor 1382 that may be used to control the temperature of the room in which the sensor is located. An advantage of this design is that the accuracy of temperature measurement in each room may be improved, thereby more easily allowing for the desired room temperature to be maintained.

The building 1010 may include a master thermostat that is in communication with each unit thermostat in all of the units 1020 in the building 1010. In other words, the unit thermostat may be used to control the single unit HVAC system 1200 and the master thermostat may be used to control the HVAC system 1000.

Accordingly, as exemplified, the first room 1022 may have a first room air distribution flow path 1240 extending between the lower port 1350 and the upper port 1352 and the second room 1024 may have a second room air distribution flow path 1240 extending between the lower port 1350 and the upper port 1352. As exemplified in FIG. 17, the air outlet 1332 of the first room 1022 has a first adjustable damper 1380 and a first temperature sensor 1382 and the air outlet 1332 of the second room 1024 has a second adjustable damper 1380 and a second temperature sensor 1382. The first damper 1380 is adjustable based on a signal from the first temperature sensor 1382 and the second damper 1380 is adjustable based on a signal from the second temperature sensor 1382. The first and second adjustable dampers 1380 may be used to control the relative amount of the distribution fluid 1242 introduced into each of the first and second rooms 1022, 1024. For example, the first and second adjustable dampers 1380 may be used to control how much of the volume of the distribution fluid 1242 is exhausted to each room. For example, 70% of the distribution fluid 1242 may go to the first room 1022 while 30% of the distribution fluid 1242 may go to the second room 1024.

An advantage of this design is that the temperature of each room may be varied independently of the other room. For example, if the first room 1022 is exposed to sun throughout the day, the first temperature sensor 1382 may read a first room temperature that is higher than a second room temperature measured by the second temperature sensor 1382. Accordingly, when in the heating cycle, a higher percentage of the distribution fluid 1242 may be exhausted to the second room 1024, to maintain the first room temperature and second room temperature at their desired values. In other words, since the sun has already provided heat to the first room 1022, less heated distribution fluid 1242 is required to maintain the first room temperature at the desired temperature, so the adjustable dampers 1380 may be used to reduce the volume of heated distribution fluid 1242 to the first room 1022 and to increase the volume of heated distribution fluid 1242 to the second room 1024. Similarly, in the cooling cycle, the room exposed to more sun may need additional cooled distribution fluid 1242 to maintain the desired temperature. Accordingly, for example, 90% of the cooled distribution fluid 1242 may be exhausted to the room exposed to the sun with only 10% of the cooled distribution fluid 1242 exhausted to the other room.

As described previously, the first motor and fan assembly 1340 may be reversible to operate the fan coil 100 in a first mode and a second mode, whereby the inlet 1330 and outlet 1332 of the fan coil 100 are reversed. The first motor and fan assembly 1340 may be used to move the distribution fluid 1242 along each of the first and second air flow distribution paths 1240. In some embodiments, the first motor and fan assembly 1340 and the second motor and fan assembly 1342 may be reversible to operate the fan coil 100 in the first mode and the second mode. In such embodiments, each of the first motor and fan assembly 1340 and the second motor and fan assembly 1342 may be used to draw air from the inlets 1330 and expel air through the outlets 1332 into each of the first and second rooms 1022, 1024.

Moveable Fan Coil

In accordance with this aspect, which may be used by itself or in combination with one or more other aspects, the single unit HVAC system 1200 has a movable fan coil 100 such that at least a portion of the fan coil 100 is movably mounted within the air distribution flow path 1240. An advantage of this aspect is that the exterior casing of the fan coil need not be part of a wall of a room. Instead, the fan coil may be behind drywall. The movable portion of the fan coil 100 may be moved to a location that enables maintenance to be performed on the fan coil 100, such as near the air return 1330 or air outlet 1332.

In accordance with this aspect, in some embodiments, at least a portion of the fan coil 100 is movable in the air distribution flow path 1240 to a position in which the fan coil 100 is located at one of the air return 1330 and the air outlet 1332. As exemplified in FIG. 17, in some embodiments, the only access to the fan coil 100 through the wall 1032 is through the air return 1330 and the air outlet 1332. Accordingly, the movable portion of the fan coil 100 may be moved to one of the air return 1330 and the air outlet 1332, thereby providing access to the fan coil 100 through the wall 1032. In the event a part of the fan coil requires routine maintenance or replacement, the fan coil 100 or the part of the fan coil 100 may be moved to the accessible air return 1330 or air outlet 1332 so that the interior of the fan coil 100 may be more easily accessed.

It will be appreciated that any component of the fan coil 100 may form a part of the movable portion of the fan coil 100. For example, the movable portion may include, but is not limited to, the second heat exchanger 1222, the catch basin 1370, the filter 1360, the motor and fan assembly 1340, and/or one or more sensors.

The movable portion of the fan coil 100 may be moved through ducting that extends from the air return 1330 to the fan coil 100 and from the fan coil 100 to the air outlet 1332. An advantage of this design is that the ducting may be clear of obstructions and provide a path in the wall 1032 for the movable portion to move without interfering with other components of the unit 1020 and/or HVAC system 1200.

It will be appreciated that the fan coil 100 may comprise or consist only of a second heat exchanger 1222, an optional catch basin 1370 and the motor and fan assembly 1340. If the second heat exchanger 1222 is connected to a low pressure closed loop 1260 and the fan coil 100 is used to moderate the temperature of only one or two rooms, then the fan coil 100 may be relatively small and able to fit between standardly positioned wall studs and may be moveable upwardly or downwardly therein such as by a motor that drives the fan coil 100 or a part thereof up and down a track within the air distribution flow path 1240 (in this case the volume between the two studs). Any drive means known in the arts may be used. It will be appreciated that since the closed loop fluid flow path 1260 uses a low pressure fluid, the conduit may be flexible such that the fan coil 100 may be raised or lowered without disconnecting the second heat exchanger 1222 from the closed loop fluid flow path 1260.

Single Unit HVAC System with Plurality of Heat Exchangers

In accordance with this aspect, which may be used by itself or in combination with one or more other aspects, the single unit HVAC system 1200 may have a plurality of fan coils 1300 each of which is connected to the closed loop fluid flow path 1260. For example, a room 1022 may have a first fan coil 100 (e.g., a second heat exchanger 1222) to modulate the temperature of the room 1022 and the room 1024 may have a second fan coil (e.g., a second heat exchanger 1222) to modulate the temperature of the room 1024. An advantage of this aspect is that the temperature of each room may be controlled independently of the other room. Another advantage is that the heat exchanger for a particular room may be turned off when not needed, thereby saving energy. Furthermore, the temperature of each room is not reliant upon a single temperature sensor located in another room. Accordingly, each room may be more easily maintained at a desired room temperature. Further, as each fan coil provides heating or cooling for less than the entire unit (e.g., a single room) the fan coil 100 may be smaller. It will be appreciated that each or all of the fan coils may include any one or more of the features that are discussed with respect to FIGS. 1-9. Alternately, one or more of the fan coils may consist essentially of or consist of a heat exchanger and a motor and fan assembly.

In accordance with this aspect, the single unit HVAC system 1200 has a first fan coil 1300*a*, a second fan coil 1300*b*, and a third fan coil 1030*c*, as exemplified in FIG. 13. The first fan coil 1300*a* is in the first room 1022, the second fan coil 1300*b* is in the second room 1024, and the third fan coil 1300*c* is in the third room 1026. Each fan coil 100 has its own respective heat exchanger in thermal communication with the sub-loop 1260 to exchange thermal energy with the sub-loop 1260. An advantage of this design is that the fan coils 1300 may operate at a relatively lower air flow rate since the movement of air in the unit 1020 is shared amongst a plurality of fan coils 1300. Operating the fan coils 1300 at a lower flow rate results in decreased noise in the unit 1020 and conserved energy in the HVAC system 1000.

As exemplified in FIG. 13A, the first fan coil 1130*a* includes the second heat exchanger 1222, the second fan coil 1130*b* includes a second heat exchanger 1222, and the third fan coil 1130*c* includes a second heat exchanger 1222. Each heat exchanger includes a modulation fluid flow path 1320 and a room air distribution flow path 1240. The air distribution flow path 1240 has an inlet 1330 for receiving air 1242 and an air outlet 1332 for delivering temperature modulated air 1242 to the respective room. Each fan coil 100 further includes a motor and fan assembly 1340 provided in the room air distribution flow path 1240 for facilitating flow of the distribution fluid 1242 in the flow path 1240. Each room may have a corresponding temperature sensor 1382 operable to monitor a temperature of the room. Each fan coil 100 may include an adjustable damper 1380 that is adjustable based on a signal from the temperature sensor 1382 as discussed previously.

During operation, the sub-loop 1260 provides the closed loop fluid 1262 to each heat exchanger. The closed loop fluid 1262 passes through each modulation fluid flow path 1320 in each heat exchanger, exchanging thermal energy with the heat exchanger. The heat exchanger then exchanges the thermal energy from the closed loop fluid 1262 to the distribution fluid 1242 in the room air distribution flow path 1240. The distribution fluid 1242 is then exhausted from the fan coil 100 into the room. The amount of distribution fluid 1242 exhausted from the fan coil 100 may be determined by the temperature sensor 1382.

The temperature of the room may be modulated by altering the volume of distribution fluid 1242 exhausted by the fan coil 100 using the adjustable damper 1380 as discussed previously. Once the temperature of the room is measured by the temperature sensor 1382, a signal is sent to the adjustable damper 1380 to adjust the damper 1380 to control the amount of distribution fluid 1242 exhausted from the air outlet 1332.

In some embodiments, the flow of closed loop fluid 1262 in the modulation fluid flow path 1320 may be adjustable based on a signal from the temperature sensor 1382. For example, as exemplified in FIG. 13A, closed loop fluid flow path 1260 includes a sub, sub loop flow path 1270 which connects the second heat exchanger 1222 in flow communication with the fub loop fluid 1262 in closed loop fluid flow path 1260. A valve 1272 is provided in sub loop flow path 1270 to adjust (e.g., reduce or terminate) the flow in a sub loop flow path 1270. Alternately, as exemplified in FIG. 13B, the closed loop fluid flow path 1260 may extend sequentially through one or more second heat exchangers 1222 and a by-pass line 1276 is provided to enable some or all of the closed loop fluid 1262 to by-pass a second heat exchanger 1222. A valve 1272 may be used to adjust (e.g., reduce or terminate) the flow in the by-pass line 1276. For example, if the riser stack 1120 is in heating mode and the temperature sensor 1382 measures that the room temperature is too hot, the amount of closed loop fluid 1262 that enters the modulation fluid flow path 1320 may be reduced by automatically adjusting the valve 1272 based on the temperature sensor signal.

Accordingly, the temperature of each room may be modulated by the temperature sensor 1382 sending a signal to the adjustable damper 1380 and/or the modulation fluid flow path valve 1272 to adjust the amount of distribution fluid 1242 that is exhausted to the room and/or adjust the amount of modulation fluid 1262 that enters the modulation fluid flow path 1320.

Heat Retaining Member

In accordance with this aspect, which may be used by itself or in combination with one or more other aspects, the HVAC system 1000 or 1200 may include one or more heat exchangers in thermal communication with a heat retaining member. The heat retaining member is in thermal communication with the modulation fluid flow path 1320 such that the heat retaining member may exchange thermal energy with the modulation fluid 1262. An advantage of this aspect is that the heat retaining member may store a large amount of thermal energy that dissipates slowly, thereby retaining the thermal energy within the HVAC system. Accordingly, the distribution fluid 1242 may be heated or cooled more rapidly to facilitate a faster temperature modulation response or an alternate heat source, such as a furnace may not be required and may have a lower heating demand. Another advantage is that thermal energy may be stored in the heat retaining member to maintain the modulation fluid 1262 at the proper temperature with increased efficiency. Another advantage is that the heat retaining member may be in communication with a renewable energy source, such as a solar-powered source, to provide a more sustainable energy source for heating the building.

In accordance with this aspect, the HVAC system 1000 or 1200 includes one or more heat retaining members 1400 in thermal communication with one or more of the heat exchangers in the HVAC system 1000, 1200. For example, as exemplified in FIG. 16, the heat retaining member 1400 may have a fluid flow path 1402 that is in thermal communication with the heat retaining member 1400, e.g., it may extend through the heat retaining member 1400 and form part of the modulation fluid flow path 1320, or it may extend around the heat retaining member 1400. The fan coil may include a heat exchanger 1222 as exemplified in FIG. 15 which is an interface between the closed loop fluid 1262 and the distribution fluid 1242. Accordingly, the heat retaining member 1400 may be in thermal communication with the distribution fluid 1242 through the heat exchanger. It will be appreciated that, in an alternate embodiment, the fluid flow path 1402 may be a separate flow loop from the closed loop flow path 1260. For example, the closed loop flow path 1260 may flow between the riser stack and the heat exchanger 1222. A separate flow loop 1402 may flow between the heat retaining member 400 and the heat exchanger 1222.

Figure 16:
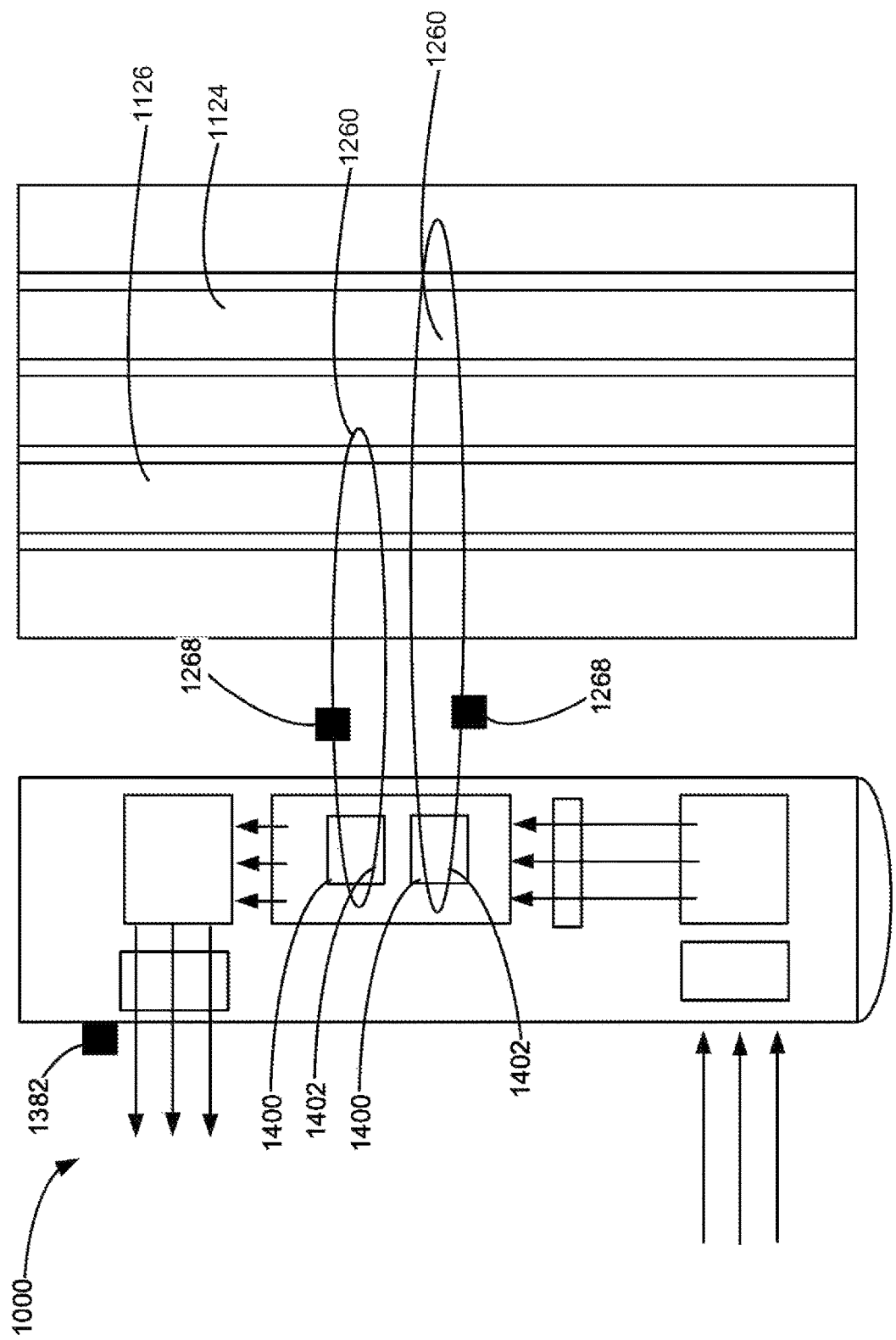
FIG. 16 is a schematic view of another single unit HVAC system in fluid communication with hot and cold risers.

As exemplified in FIG. 16, the single unit HVAC system 1200 may include a plurality of heat retaining members 1400. The first heat retaining member 1400 is in thermal communication with the hot riser 1124 and the second heat retaining member 1400 is in thermal communication with the cold riser 1126. Accordingly, the first heat retaining member 1400 is heated by the hot riser 1124 and the second heat retaining member 1400 is cooled by the cold riser 1126. It will be appreciated that, when there is a single riser that alternates with heating and cooling fluid, there may be a single heat retaining member 1400 in thermal communication with the riser 1120.

During operation, for example, to heat the unit 1020, the modulation fluid 1262 flows through the heat retaining member 1400 and draws thermal energy from the heat retaining member 1400. The modulation fluid 1262 then exchanges the thermal energy to the distribution fluid 1242 through the heat exchanger 1222, thereby heating the air 1242.

It will be appreciated that the closed loop fluid flow path may continue to circulate closed loop fluid while the fan coil is not in use to thereby pre-heat or pre-cool the heat retaining member 1400.

Figure 19:
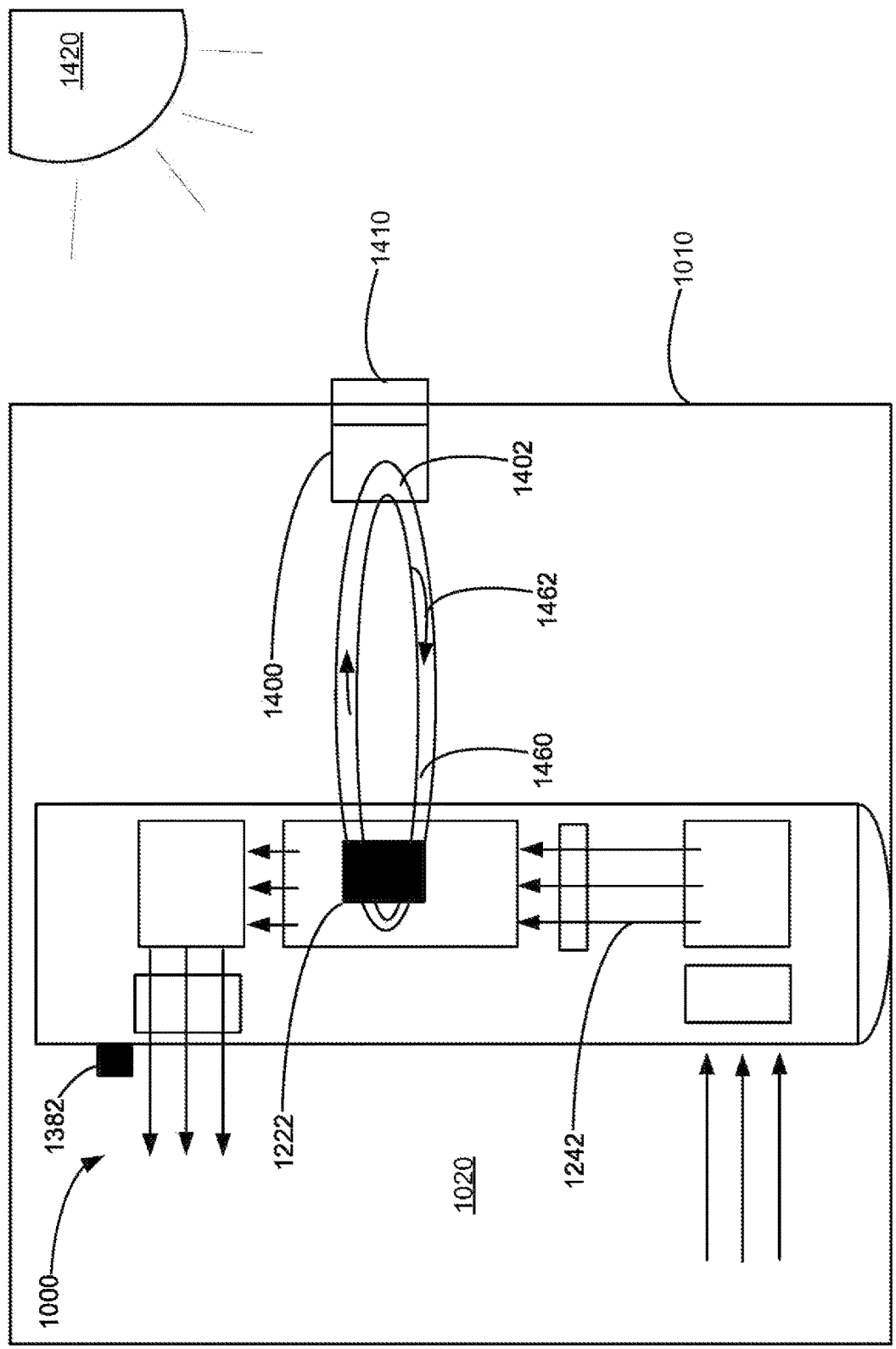
FIG. 19 is a schematic view of another single unit HVAC system in fluid communication with a heat retaining member.

Alternately, or in addition, as exemplified in FIG. 19, the heat retaining member 1400 may be in thermal communication with an external heating or cooling source 1410, such as a solar-powered heating source 1410 (e.g., solar heated panels). The solar energy from the sun 1420 may be used to supplement the heating of the building 1010 by thermally charging the heat retaining member 1400. A modulation fluid 1462 may flow between the solar-powered source and the heat exchanger 1222 such that the modulation fluid may thermally exchange the thermal energy from the thermally charged heat retaining member 1400 with the distribution fluid 1242 to heat the unit 1020. Similarly, the heating or cooling source 1410 may be used to provide cooling to the heat retaining member 1400 to remove thermal energy from the heat retaining member 1400 (e.g., an external air conditioner). The cooled heat retaining member 1400 may then be used to remove thermal energy from the modulation fluid 1462, thereby cooling the modulation fluid 1462. The cooled modulation fluid 1462 may then thermally exchange energy with the distribution fluid 1242 to cool the unit 1020.

The heat retaining member 1400 may be encased in an insulating material, such that the only thermal energy transfer from the heat retaining member 1400 to the distribution fluid 1262 occurs through the heat exchanger 1222.

It will be appreciated that the fan coil 100 may comprise two heat exchangers, one that is part of a loop including the riser stack and a second that is part of a loop including the heating or cooling source 1410.

It will also be appreciated that, in the embodiment of FIG. 19, the heat exchanger may also be in thermal communication with the riser stack as discussed herein.

It will also be appreciated that the heat retaining member 1400 may be provided at any location in a flow loop.

It will be appreciated that the heat retaining member 1400 may be any device and/or material capable of storing thermal energy. For example, the heat retaining member 1400 may be a solid material. In some embodiments, the heat retaining member 1400 may be stone, optionally granite, or metal, optionally aluminum.

The heat retaining member 1400 may be directly heated by, for example, the solar-powered energy source 1410, or may be indirectly heated. For example, a lens 1410 may be used to direct sunlight onto the heat retaining member 1400 to thermally charge the heat retaining member, thereby directly heating the heat retaining member 1400. The lens may indirectly heat the heat retaining member 1400 by heating a conductive material that passes through the heat retaining member 1400 to thermally charge the heat retaining member 1400.

To cool the heat retaining member 1400, an adsorption cycle air conditioner may be used. For example, the solar energy stored in the heat retaining member 1400 may be used to power an adsorption cycle. The adsorption cycle may use, for example, ammonia or lithium bromide. An advantage of this design is that rare earth metals are not needed for the cooling cycle. When using an adsorption cycle with ammonia, there may be an ammonia sensor for detecting the presence of ammonia. If ammonia is detected, a vacuum jar may be used to suck the ammonia into the storage device. The ammonia cycle may be isolated from the sub-loop 1260 to protect the occupants of the building 1010 in the event of a leak.

It will be appreciated that the heat retaining member 1400 may be part of the closed loop fluid flow path 1260 or part of a separate flow path 1460. For example, in the embodiment of FIG. 16, another closed loop may deliver heated or cooled fluid to the heat retaining member 1400. Alternately, as exemplified in FIG. 19, the heat retaining member 1400 may have its own closed loop fluid flow path 1460 that extends to the second heat exchanger 1222. Such an embodiment may be used if the heat retaining member 1400 is exterior unit 1020 and optionally exterior to the building 1010.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clause Set a:

1. A fan coil comprising:
   (a) a heat exchanger comprising a modulation fluid flow path and a unit air distribution flow path, the unit air distribution flow path has an inlet for receiving air from a room and an outlet for delivering temperature modulated air, wherein the modulation fluid flow path is operable to receive a fluid that is at a pressure of up to 50 psi; and,
   (b) a first motor and fan assembly in the unit air distribution flow path.
2. The fan coil of clause 1 wherein the modulation fluid flow path is operable to receive a fluid that is at a pressure of up to 30 psi.
3. The fan coil of clause 1 wherein the modulation fluid flow path comprises a conduit having a wall thickness of 0.01 to 0.06 inches.
4. The fan coil of clause 3 wherein the conduit has a wall thickness of 0.02 to 0.04 inches.
5. The fan coil of clause 3 wherein the conduit is metal.
6. The fan coil of clause 1 wherein the modulation fluid flow path further comprises a low pressure closed loop flow path that is connected in thermal communication with a high pressure riser stack of a multi-floor building.
7. The fan coil of clause 1 wherein the fan coil is sized to fit between two wall studs in a building.
8. The fan coil of clause 1 wherein the fan coil has a front side having an air outlet of the unit air distribution flow path and the front side has a width of less than 16 inches.
9. The fan coil of clause 1 wherein the unit air distribution flow path has a lower port positioned to be adjacent a floor of a room and an upper port positioned to be adjacent a ceiling of a room, and the first motor and fan assembly is a reversing motor and fan assembly that is operable in a first mode to direct air through the upper port and is also operable in a second mode to direct air through the lower port, wherein, in the first mode, the lower port functions as the inlet and the upper port functions as the outlet and in the second mode the upper port functions as the inlet and the lower port functions as the outlet.
10. The fan coil of clause 1 further comprising a second motor and fan assembly, wherein the unit air distribution flow path has a lower port positioned to be adjacent a floor of a room and an upper port positioned to be adjacent a ceiling of a room, and the first motor and fan assembly is operable to direct air through the upper port whereby the lower port functions as the inlet and the upper port functions as the outlet, and the second motor and fan assembly is operable to direct air through the lower port whereby the upper port functions as the inlet and the lower port functions as the outlet.
11. The fan coil of clause 10 wherein at least one of the first and second motor and fan assemblies is a reversing fan.
12. The fan coil of clause 11 wherein both of the first and second motor and fan assemblies are operable concurrently to direct air through one of the upper and lower ports.
13. The fan coil of clause 9 wherein the fan coil operates at 15-25, 15-20, or 14-18 dB.
14. A fan coil system comprising:
   (a) a heat exchanger comprising a modulation fluid flow path and a unit air distribution flow path, the unit air distribution flow path has an inlet for receiving air from a room and an outlet for delivering temperature modulated air, the modulation fluid flow path is connectable with a source of heating or cooling fluid; and,
   (b) a first reversing motor and fan assembly in the unit air distribution flow path wherein the unit air distribution flow path has a lower port positioned to be adjacent a floor of a room and an upper port positioned to be adjacent a ceiling of a room, and the first reversing motor and fan assembly is operable in a first mode to direct air through the upper port and is also operable in a second mode to direct air through the lower port, wherein, in the first mode, the lower port functions as the inlet and the upper port functions as the outlet and in the second mode the upper port functions as the inlet and the lower port functions as the outlet.
15. The fan coil of clause 14 further comprising a second motor and fan assembly wherein the second motor and fan assembly is operable to direct air through one of the upper and lower ports.
16. The fan coil of clause 15 wherein the second motor and fan assembly is a second reversing motor and fan assembly.
17. The fan coil of clause 15 wherein the first reversing motor and fan assembly and the second motor and fan assembly is operable concurrently to direct air through one of the upper and lower ports.
18. The fan coil of clause 15 wherein the fan coil operates at 15-25, 15-20, or 14-18 dB.
19. A building comprising a first unit, the first unit having a fan coil comprising a heat exchanger and a motor and fan assembly wherein the fan coil is positioned behind a wall and between two studs of the unit.
20. The building of clause 19 wherein the heat exchanger comprises a modulation fluid flow path and a unit air distribution flow path, the unit air distribution flow path has an inlet for receiving air from a room and an outlet for delivering temperature modulated air, wherein the modulation fluid flow path is operable to receive a fluid that is at a pressure of up to 50 psi.
21. The fan coil of clause 19 wherein the modulation fluid flow path further comprises a low pressure closed loop flow path that is connected in thermal communication with a high pressure riser stack of the building.

Clause Set B:
1. A building comprising a first unit, the first unit having a first HVAC system, a first room and an adjacent second room, the first HVAC system comprising a fan coil positioned in a wall separating the first and second rooms, each room having an air return and an air outlet from the fan coil wherein the fan coil is in flow communication with the air return of each room and is also in flow communication with the air outlet of each room.
2. The building of clause 1 wherein the fan coil is positioned between two studs of the wall.
3. The building of clause 1 wherein the air outlet of the first room comprises a first adjustable damper and has a first temperature sensor, the air outlet of the second room comprises a second adjustable damper and has a second temperature sensor, the first damper is adjustable based on a signal from the first temperature sensor and the second damper is adjustable based on a signal from the second temperature sensor.
4. The building of clause 1 wherein the HVAC system further comprises a first reversing motor and fan assembly and a first room air distribution flow path comprising a lower port positioned adjacent a floor of the first room and an upper port positioned adjacent a ceiling of the first room and a second room air distribution flow path comprising a lower port positioned adjacent a floor of the second room and an upper port positioned adjacent a ceiling of the second room and the first reversing motor and fan assembly is operable in a first mode to direct air through the upper ports and is also operable in a second mode to direct air through the lower ports, wherein, in the first mode, the lower ports function as air returns of the first and second room air distribution flow paths and the upper ports function as air outlets of the first and second room air distribution flow paths and in the second mode the upper ports function as the air returns of the first and second room air distribution flow paths and the lower ports function as the air outlets of the first and second room air distribution flow paths.
5. The building of clause 1 wherein the HVAC system further comprises a first motor and fan assembly, a second motor and fan assembly, a first room air distribution flow path comprising a first port and a second port and a second room air distribution flow path comprising a first port and a second port wherein the first motor and fan assembly is operable to draw air from the first ports and to direct air out through the second ports whereby the first ports function as the air returns of the first and second room air distribution flow paths and the second ports function as the air outlets of the first and second room air distribution flow paths and the second motor and fan assembly is operable to draw air from the second ports and to direct air out through the first ports whereby the second ports function as the air returns of the first and second room air distribution flow paths and the first ports function as the air outlets of the first and second room air distribution flow paths.

6. The building of clause 5 wherein at least one of the first and second motor and fan assemblies is a reversing fan and motor assembly and the first and second motor and fan assemblies are operable concurrently to draw air from the first ports and to direct air out through the second ports.

7. The building of clause 6 wherein the HVAC system operates at 15-25, 15-20, or 14-18 dB.

8. The building of clause 6 wherein the air outlet of the first room comprises a first adjustable damper and has a first temperature sensor, the air outlet of the second room comprises a second adjustable damper and has a second temperature sensor, the first damper is adjustable based on a signal from the first temperature sensor and the second damper is adjustable based on a signal from the second temperature sensor.

9. The building of clause 5 wherein each of the first and second motor and fan assemblies is a reversing fan and motor assembly and the first and second motor and fan assemblies are operable concurrently in a first mode to draw air from the first ports and to direct air out through the second ports and concurrently in a second mode to draw air from the second ports and to direct air out through the first ports.

Clause Set C:
1. A building comprising a first unit, the first unit having an HVAC system comprising a fan coil positioned in a wall and an air distribution flow path, the air distribution flow path comprising an air return and an air outlet wherein at least a portion of the fan coil is movably mounted within the air distribution flow path to a position in which the fan coil is located at one of the air return and the air outlet.

2. The building of clause 1 wherein the fan coil comprises a heat exchanger and the at least a portion of the fan coil comprises the heat exchanger.

3. The building of clause 1 wherein the fan coil comprises a heat exchanger and the air distribution flow path comprises ducting extending from the air return to the fan coil and from the fan coil to the air outlet and the at least a portion of the fan coil is moveably mounted within the ducting.

Clause Set D:
1. A fan coil system comprising:
   (a) a heat exchanger comprising a modulation fluid flow path and an air distribution flow path, the air distribution flow path has a first port and a second port, the modulation fluid flow path is connectable with a source of heating or cooling fluid;
   (b) a first motor and fan assembly in the unit air distribution flow path wherein the first motor and fan assembly is operable to draw air from the first port and to direct air out through the second port whereby the first port functions as an air return of the air distribution flow path and the second port functions as an air outlet of the air distribution flow path; and,
   (c) a second motor and fan assembly in the unit air distribution flow path wherein the second motor and fan assembly is operable to draw air from the second port and to direct air out through the first port whereby the second port functions as an air return of the air distribution flow path and the first port functions as an air outlet of the air distribution flow path.

2. The fan coil of clause 1 wherein the first motor and fan assembly is a reversing motor and fan assembly that is operable in a first mode to direct air through the second port and is also operable in a second mode to direct air through the first port and the first motor and fan assembly is operable in the second mode concurrently with the second motor and fan assembly.

3. The fan coil of clause 1 wherein the first motor and fan assembly is a first reversing motor and fan assembly that is operable in a first mode to direct air through the second port and is also operable in a second mode to direct air through the first port, the second motor and fan assembly is a second reversing motor and fan assembly that is operable in a first mode to direct air through the first port and is also operable in a second mode to direct air through the second port and the first and second motor and fan assemblies are operable concurrently in the first mode.

4. The fan coil of clause 3 wherein the first and second motor and fan assemblies are operable concurrently in the second mode.

5. The fan coil of clause 2 wherein the fan coil operates at 15-25, 15-20, or 14-18 dB.

Clause Set E:
1. An HVAC system for a single unit having a first room and a second room, the HVAC system comprising:
   (a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
   (b) a first temperature sensor operable to monitor a temperature of the first room, wherein the air outlet of the first room comprises a first adjustable damper and the first damper is adjustable based on a signal from the first temperature sensor;
   (c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and,
   (d) a second temperature sensor operable to monitor a temperature of the second room, wherein the air outlet of the second room comprises a second adjustable damper and the second damper is adjustable based on a signal from the second temperature sensor, wherein the first and second modulation fluid flow paths are operable to receive a fluid that is at a pressure of up to 50 psi.
2. The HVAC system of clause 1 wherein the first and second modulation fluid flow paths are operable to receive a fluid that is at a pressure of up to 30 psi.
3. HVAC system of clause 1 wherein the first and second modulation fluid flow paths comprise a conduit having a wall thickness of 0.01 to 0.06 inches.
4. The HVAC system of clause 3 wherein the conduit has a wall thickness of 0.02 to 0.04 inches.
5. The HVAC system of clause 3 wherein the conduit is metal.
6. The HVAC system of clause 1 wherein the first and second modulation fluid flow paths are part of a closed loop fluid flow path extending between the first and second heat exchangers and a riser stack of a building.
7. The HVAC system of clause 6 wherein a flow of fluid in the first modulation fluid flow path is adjustable based on a signal from the first temperature sensor.
8. The HVAC system of clause 7 wherein a flow of fluid in the second modulation fluid flow path is adjustable based on a signal from the second temperature sensor.
9. The HVAC system of clause 1 wherein the single unit comprises one condominium in a condominium block.
10. An HVAC system for a single unit having a first room and a second room, the HVAC system comprising:
    (a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
    (b) a first temperature sensor operable to monitor a temperature of the first room;
    (c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and,
    (d) a second temperature sensor operable to monitor a temperature of the second room,
    wherein the first and second modulation fluid flow paths are part of a closed loop fluid flow path extending between the first and second heat exchangers and a riser stack of a building and a flow of fluid in the first modulation fluid flow path is adjustable based on a signal from the first temperature sensor.
11. The HVAC system of clause 10 wherein a flow of fluid in the second modulation fluid flow path is adjustable based on a signal from the second temperature sensor.
12. The HVAC system of clause 11 wherein the single unit comprises one condominium in a condominium block.
13. An HVAC system for a single unit having a first room and a second room, the HVAC system comprising:
    (a) a first heat exchanger comprising a first modulation fluid flow path and a first room air distribution flow path, the first room air distribution flow path has an inlet for receiving air and an air outlet for delivering temperature modulated air to the first room with a first motor and fan assembly provided in the first room air distribution flow path;
    (b) a first temperature sensor operable to monitor a temperature of the first room wherein the first modulation fluid flow path is part of a first closed loop fluid flow path extending between the first heat exchanger and a riser stack of a building and a flow of fluid in the first modulation fluid flow path is adjustable based on a signal from the first temperature sensor;
    (c) a second heat exchanger comprising a second modulation fluid flow path and a second room air distribution flow path, the second room air distribution flow path has an inlet for receiving air and an air outlet for delivering temperature modulated air to the second room with a second motor and fan assembly provided in the second room air distribution flow path; and,
    (d) a second temperature sensor operable to monitor a temperature of the second room, wherein the second modulation fluid flow path is part of a second closed loop fluid flow path extending between the second heat exchanger and a riser stack of a building and a flow of fluid in the second modulation fluid flow path is adjustable based on a signal from the second temperature sensor.
14. The HVAC system of clause 13 wherein the single unit comprises one condominium in a condominium block.

Clause Set F:
1. An HVAC system comprising:
    (a) a heat exchanger comprising a modulation fluid flow path and an air distribution flow path, the air distribution flow path has an inlet for receiving air and an air outlet for delivering temperature modulated air;
    (b) a first motor and fan assembly provided in the air distribution flow path; and,
    (c) a heat retaining member in thermal communication with the modulation fluid flow path, wherein the heat retaining member comprises a solid material.
2. The HVAC system of clause 1 wherein the heat retaining member comprises stone or metal.
3. The HVAC system of clause 2 wherein the heat retaining member comprises aluminium.
4. The HVAC system of clause 2 wherein the heat retaining member comprises stone.
5. The HVAC system of clause 2 wherein the heat retaining member comprises granite.
6. The HVAC system of clause 1 wherein the heat retaining member has a fluid flow path therethrough and comprises part of the modulation fluid flow path.
7. The HVAC system of clause 1 wherein the modulation fluid flow path is operable to receive a fluid that is at a pressure of up to 50 psi.
8. The HVAC system of clause 1 wherein the modulation fluid flow path is operable to receive a fluid that is at a pressure of up to 30 psi.
9. HVAC system of clause 1 wherein the modulation fluid flow path comprises a conduit having a wall thickness of 0.01 to 0.06 inches.
10. The HVAC system of clause 9 wherein the conduit has a wall thickness of 0.02 to 0.04 inches.
11. The HVAC system of clause 9 wherein the conduit is metal.

Clause Set G:
1. An HVAC system comprising:
    a) a fan coil having an exhaust air outlet port through which exhaust air exits the fan coil and an air inlet port through which input air enters the fan coil; and, b) an oxygen concentrator operable in an oxygen enrichment mode to transfer oxygen from the exhaust air and deliver the oxygen to the input air.
2. The HVAC system of clause 1 wherein the oxygen concentrator is a regenerable oxygen concentrator.
3. The HVAC system of clause 2 wherein the oxygen concentrator is a pressure swing adsorption oxygen concentrator.
4. The HVAC system of clause 3 wherein, in the oxygen enrichment mode, the oxygen concentrator adsorbs nitrogen from the exhaust air using a molecular sieve thereby providing oxygen enriched air and the oxygen enriched air is combined with the input air.
5. The HVAC system of clause 4 wherein the oxygen concentrator is also operable in a regeneration mode wherein the nitrogen is desorbed from the molecular sieve.
6. The HVAC system of clause 1 wherein fan coil is part of a HRV or ERV unit and the oxygen concentrator is part of the HRV or ERV unit.
7. The HVAC system of clause 1 further comprising an oxygen sensor operably connected to the oxygen concentrator whereby the oxygen concentrator is actuated when the oxygen sensor detects an oxygen level below a predetermined level.
8. The HVAC system of clause 7 wherein the oxygen concentrator is deactivated when the oxygen sensor detects an oxygen level above a predetermined level.
9. The HVAC system of clause 1 wherein the oxygen concentrator is connected in flow communication with the exhaust air outlet port and the air inlet port.
10. The HVAC system of clause 9 wherein the oxygen concentrator receives a bleed stream of the exhaust air.
11. The HVAC system of clause 1 wherein the fan coil includes a heat exchanger, and the oxygen concentrator is connected in flow communication with the input air upstream of the heat exchanger.
12. The HVAC system of clause 1 further comprising a filter positioned upstream of the oxygen concentrator.
13. An air treatment apparatus for an enclosed living space comprising an air flow path extending from an air inlet to an air outlet with an oxygen concentrator and an air moving member provided in the air flow path, wherein the oxygen concentrator is operable in an oxygen enrichment mode in which nitrogen is removed from air entering the air inlet and oxygen enriched air is exhausted from the air outlet and the oxygen concentrator is also operable in a regeneration mode wherein the nitrogen that was removed from air entering the air inlet is exhausted at a location exterior to the living space.
14. The air treatment apparatus of clause 13 wherein the apparatus is portable whereby the apparatus is operated in the oxygen enrichment mode when located in the living space and the apparatus is operated in the regeneration mode when located exterior to the living space.
15. The air treatment apparatus of clause 13 wherein the apparatus has an inlet conduit which extends from a location exterior to the living space to the air inlet whereby, in the oxygen enrichment mode, fresh air is drawn into the inlet conduit from exterior to the living space and oxygen enriched air exits the air outlet to the living space.
16. The air treatment apparatus of clause 15 wherein the apparatus has an outlet conduit which extends from an exhaust outlet to a location exterior to the living space whereby, in the regeneration mode, nitrogen that was removed from air entering the inlet conduit is exhausted through the outlet conduit to the location exterior to the living space.
17. The air treatment apparatus of clause 13 further comprising a filter positioned upstream of the oxygen concentrator.
18. The air treatment apparatus of clause 13 further comprising a wall mount or a window mount.

What is claimed is:

1. A multi-unit building HVAC system comprising:
(a) a riser stack; and,
(b) a first single unit HVAC system for a unit in a multi-unit building, the first single unit HVAC system comprising:
i) a first heat exchanger thermally connected to the riser stack;
ii) a first fan coil comprising a first unit heat exchanger and a first motor and fan assembly wherein, in operation, the first motor and fan assembly delivers air to a first location in the unit;
iii) and a second fan coil comprising a second unit heat exchanger and a second motor and fan assembly wherein, in operation, the second motor and fan assembly delivers air to a second location in the unit; and,
iv) a closed loop fluid flow path extending from the first heat exchanger and to each of the first unit heat exchanger and the second unit heat exchanger prior to returning to the first heat exchanger,
wherein, when the closed loop fluid is being circulated in the closed loop fluid flow path and the first and second motor and fan assemblies are in operation, the first heat exchanger exchanges heat between the riser stack fluid and the closed loop fluid, the first unit heat exchanger exchanges heat between the closed loop fluid and air that is delivered to the first location in the unit, and the second unit heat exchanger exchanges heat between the closed loop fluid and air that is delivered to the second location in the unit.

2. The multi-unit building HVAC system of claim 1 wherein a temperature of each location of the unit is individually controllable.

3. The multi-unit building HVAC system of claim 1 wherein the first single unit HVAC system further comprises a first temperature sensor provided in the first location of the unit and a second temperature sensor provided in the second location of the unit, the first sensor is operable to adjust the temperature of the first location of the unit and the second sensor is operable to adjust the temperature of the second location of the unit.

4. The multi-unit building HVAC system of claim 3 wherein the first sensor is operable to adjust an amount of air provided by the first motor and fan assembly to the first location of the unit, and the second sensor is operable to adjust an amount of air provided by the second motor and fan assembly to the second location of the unit.

5. The multi-unit building HVAC system of claim 1 wherein the first single unit HVAC system further comprises a temperature sensor and a flow rate of fluid in the closed loop fluid flow path is adjustable based on a signal from the temperature sensor.

6. The multi-unit building HVAC system of claim 1 wherein the first single unit HVAC system further comprises a valve which is operable to adjust a flow of fluid in the closed loop fluid flow path.

7. The multi-unit building HVAC system of claim 1 wherein the unit has a first room having the first fan coil and a second room having the second fan coil and, the closed loop fluid flow path extends sequentially through the first unit heat exchanger and the second unit heat exchanger.

8. The multi-unit building HVAC system of claim 1 wherein the closed loop fluid flow path is adjustable between a first operating mode in which the closed loop fluid flows at a first rate through the first unit heat exchanger and the closed loop fluid flows at a second rate through the second unit heat exchanger and a second operating mode in which the rate of fluid flowing through the second unit heat exchanger is adjusted while the rate of fluid flowing through the first unit heat exchange remains constant.

9. The multi-unit building HVAC system of claim 8 wherein the closed loop fluid flow path further comprises a valve that is operable to reduce or terminate flow of the closed loop fluid through the first unit heat exchange.

10. A multi-unit building HVAC system comprising:
(a) a riser stack; and,
(b) a first single unit HVAC system for a unit in a multi-unit building, the first single unit HVAC system comprising:
  i) a first heat exchanger thermally connected to the riser stack;
  ii) a first fan coil comprising a first unit heat exchanger and a first motor and fan assembly wherein, in operation, the first motor and fan assembly delivers air to a first location in the unit;
  iii) and a second fan coil comprising a second unit heat exchanger and a second motor and fan assembly wherein, in operation, the second motor and fan assembly delivers air to a second location in the unit; and,
  iv) a closed loop fluid flow path extending between the first heat exchanger the first fan coil and the second fan coil, wherein the closed loop fluid flow path is connected in series with the first and second fan coils.

11. A multi-unit building HVAC system comprising:
(a) a riser stack; and,
(b) a first single unit HVAC system for a unit in a multi-unit building, the first single unit HVAC system comprising:
  i) a first heat exchanger thermally connected to the riser stack;
  ii) a first fan coil comprising a first unit heat exchanger and a second fan coil comprising a second unit heat exchanger; and,
  iii) a closed loop fluid flow path extending from the first heat exchanger and to each of the first unit heat exchanger and the second unit heat exchanger prior to returning to the first heat exchanger,
wherein, in operation, the first heat exchanger exchanges heat between a riser stack fluid in the riser stack and a closed loop fluid in the closed loop fluid flow path, and each of the fan coils is operable to modulate a temperature of a portion of the unit.

12. The multi-unit building HVAC system of claim 11 wherein the closed loop fluid flow path is connected in series with the first and second fan coils.

13. The multi-unit building HVAC system of claim 11 wherein a temperature of each portion of the unit is individually controllable.

14. The multi-unit building HVAC system of claim 11 wherein the first single unit HVAC system further comprises a first temperature sensor provided in a first portion of the unit and a second temperature sensor provided in a second portion of the unit, the first sensor is operable to adjust the temperature of the first portion of the unit and the second sensor is operable to adjust the temperature of the second portion of the unit.

15. The multi-unit building HVAC system of claim 14 wherein each of the fan coils further comprises a motor and fan assembly, the first sensor is operable to adjust an amount of air provided by the motor and fan assembly of the first fan coil to the first portion of the unit, and the second sensor is operable to adjust an amount of air provided by the motor and fan assembly of the second fan coil to the second portion of the unit.

16. The multi-unit building HVAC system of claim 11 wherein the first single unit HVAC system further comprises a temperature sensor and a flow rate of fluid in the closed loop fluid flow path is adjustable based on a signal from the temperature sensor.

17. The multi-unit building HVAC system of claim 11 wherein the first single unit HVAC system further comprises a valve which is operable to adjust a flow of fluid in the closed loop fluid flow path.

18. The multi-unit building HVAC system of claim 11 wherein the unit has a first room having the first fan coil and a second room having the second fan coil and, the closed loop fluid flow path extends sequentially through the first unit heat exchanger and the second unit heat exchanger.

19. The multi-unit building HVAC system of claim 11 wherein the closed loop fluid flow path is adjustable between a first operating mode in which the closed loop fluid flows at a first rate through the first unit heat exchanger and the closed loop fluid flows at a second rate through the second unit heat exchanger and a second operating mode in which the rate of fluid flowing through the second unit heat exchanger is adjusted while the rate of fluid flowing through the first unit heat exchange remains constant.

20. The multi-unit building HVAC system of claim 19 wherein the closed loop fluid flow path further comprises a valve that is operable to reduce or terminate flow of the closed loop fluid through the first unit heat exchange.

* * * * *